US009172835B2

(12) United States Patent
Kurokawa et al.

(10) Patent No.: US 9,172,835 B2
(45) Date of Patent: Oct. 27, 2015

(54) INFORMATION PROCESSING APPARATUS, INFORMATION PROCESSING SYSTEM, IMAGE FORMING APPARATUS, IMAGE FORMING SYSTEM, AND COMPUTER READABLE MEDIUM

(71) Applicant: FUJI XEROX CO., LTD., Tokyo (JP)

(72) Inventors: Masaki Kurokawa, Saitama (JP); Eiji Shimoichi, Saitama (JP); Yuriko Inakawa, Saitama (JP); Eiji Nishi, Saitama (JP); Noriyuki Tatsuma, Saitama (JP); Akira Okamoto, Saitama (JP); Takanari Ishimura, Saitama (JP); Yoshiyuki Yoda, Saitama (JP); Akihide Oshima, Saitama (JP); Atsuhiro Itoh, Saitama (JP); Fumio Harada, Saitama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/458,333

(22) Filed: Aug. 13, 2014

(65) Prior Publication Data
US 2014/0347698 A1 Nov. 27, 2014

Related U.S. Application Data

(63) Continuation of application No. 12/100,432, filed on Apr. 10, 2008, now Pat. No. 8,830,499.

(30) Foreign Application Priority Data

Sep. 26, 2007 (JP) ................................. 2007-250190

(51) Int. Cl.
*G06F 3/12* (2006.01)
*H04N 1/00* (2006.01)
*G06F 21/62* (2013.01)
*H04N 1/44* (2006.01)
*H04N 1/32* (2006.01)
*H04L 9/32* (2006.01)

(52) U.S. Cl.
CPC .......... *H04N 1/00973* (2013.01); *G06F 3/1296* (2013.01); *G06F 21/6218* (2013.01);
(Continued)

(58) Field of Classification Search
USPC .............. 358/1.13, 1.14, 1.15, 1.16; 709/228, 709/237, 238
See application file for complete search history.

(56) References Cited

U.S. PATENT DOCUMENTS 7,773,241 B2    8/2010  Akao
7,978,359 B2 *  7/2011  Koarai ......................... 358/1.15
(Continued)

FOREIGN PATENT DOCUMENTS

JP    2001-014202 A    1/2001
JP    2001-273221 A    10/2001
(Continued)

*Primary Examiner* — Vu B Hang
(74) *Attorney, Agent, or Firm* — Sughrue Mion, PLLC

(57) ABSTRACT

An information processing apparatus includes: an information storage that stores information; a request accepting section that accepts a predetermined request for the information; a setting section that, for each of the information, sets whether the predetermined request is allowed; a setting storage that stores a setting by the setting section; a determining section that, with respect to the information corresponding to a request accepted by the request accepting section, reads out a corresponding setting from the setting storage, and that determines allowance/non-allowance of the predetermined request; and a process executing section that, in a case where the determining section determines allowance of the predetermined request, executes a process corresponding to the predetermined request on the information.

23 Claims, 24 Drawing Sheets

(52) U.S. Cl.
CPC ....... *H04N1/00209* (2013.01); *H04N 1/00244* (2013.01); *H04N 1/00347* (2013.01); *H04N 1/00464* (2013.01); *H04N 1/00925* (2013.01); *H04N 1/444* (2013.01); *H04N 1/4413* (2013.01); *G06F 2221/2119* (2013.01); *H04L 9/3234* (2013.01); *H04N 1/00204* (2013.01); *H04N 1/32358* (2013.01); *H04N 2201/001* (2013.01); *H04N 2201/0039* (2013.01); *H04N 2201/0074* (2013.01); *H04N 2201/0094* (2013.01)

(56) References Cited

U.S. PATENT DOCUMENTS

| | | | |
|---|---|---|---|
| 2003/0101236 A1 | 5/2003 | Ohara | |
| 2006/0126100 A1* | 6/2006 | Jung | 358/1.14 |
| 2006/0279779 A1* | 12/2006 | Kaufman et al. | 358/1.15 |
| 2008/0007768 A1* | 1/2008 | Cho | 358/1.15 |
| 2008/0018957 A1 | 1/2008 | Suzuki | |

FOREIGN PATENT DOCUMENTS

| | | |
|---|---|---|
| JP | 2003-54101 A | 2/2003 |
| JP | 2004-005394 A | 1/2004 |
| JP | 2004-185464 A | 7/2004 |
| JP | 2004-206365 A | 7/2004 |
| JP | 2004-280484 A | 10/2004 |
| JP | 2005-149256 A | 6/2005 |
| JP | 2005-153199 A | 6/2005 |
| JP | 2005-229204 A | 8/2005 |
| JP | 2005-267002 A | 9/2005 |
| JP | 2007-156788 A | 6/2007 |
| JP | 2007-193562 A | 8/2007 |

* cited by examiner

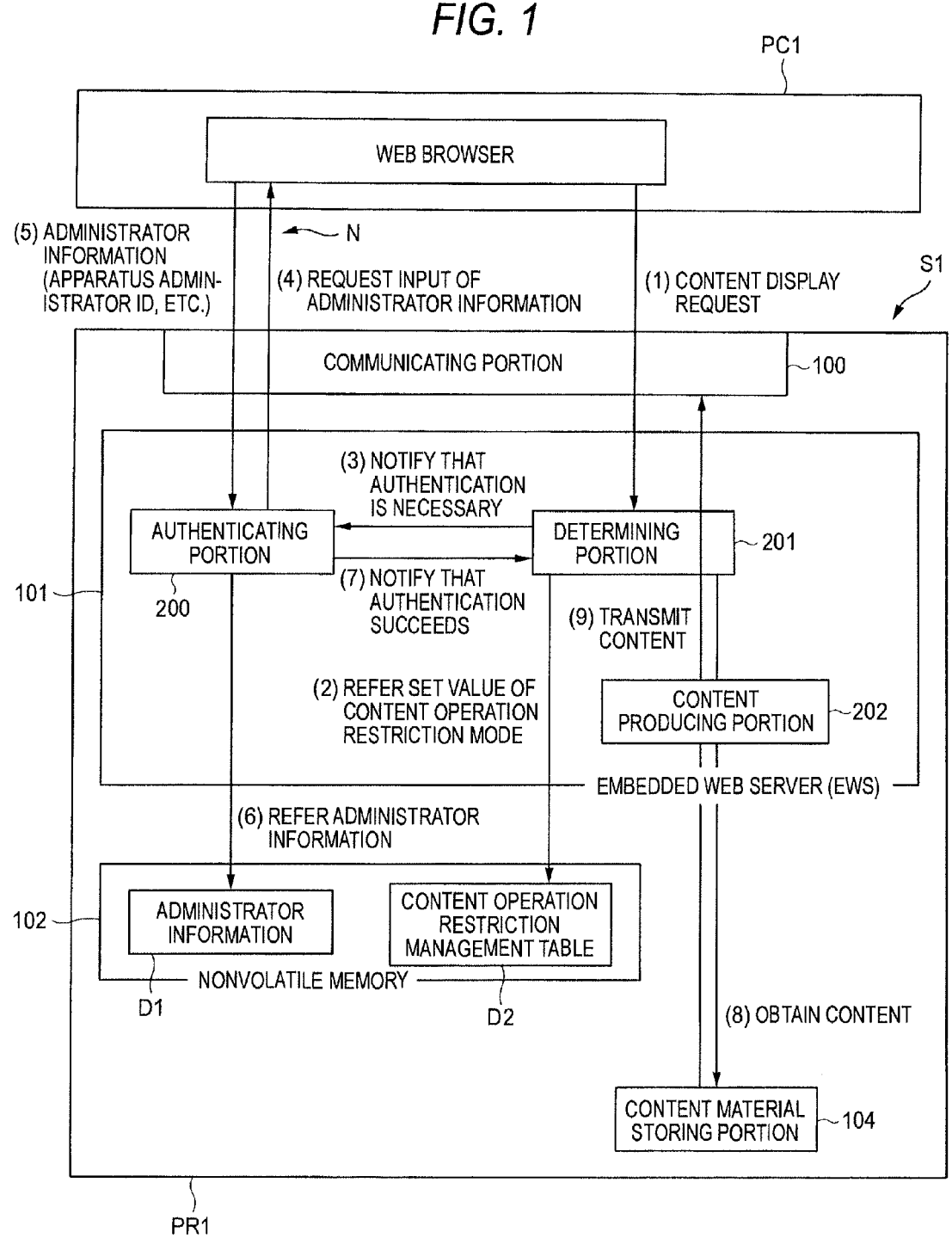

FIG. 2

| MAJOR CLASSIFICATION | INTERMEDIATE CLASSIFICATION | MINOR CLASSIFICATION |
|---|---|---|
| PRINT | EXECUTION | |
| | SUSPENSION | |
| | ABORT | |
| SCAN | EXECUTION | |
| | SUSPENSION | |
| | ABORT | |
| FACSIMILE | EXECUTION | |
| | SUSPENSION | |
| | ABORT | |
| SERVICE SET UP | → | → |
| | USUAL | |
| STATE | DEVICE INFORMATION | SHEET TRAY |
| | | DISCHARGE TRAY |
| | | COVER |
| | | CONSUMABLES |
| | EVENT INFORMATION | EVENT INFORMATION |
| JOB | JOB LIST | |
| | HISTORY LIST | JOB HISTORY |
| PROPERTY | DESCRIPTION OF MAIN UNIT | |
| | CONFIGURATION OF MAIN UNIT | |
| | DISPLAY OF COUNTER | |
| | INITIALIZATION | |
| | SECURITY | SETTING OF SSL/TLS |
| | (OUTSIDE TREE) | OWN CERTIFICATE |
| | MANAGEMENT OF CERTIFICATE | MAINTENANCE OF CERTIFICATE |

FIG. 3

| MAJOR CLASSIFICATION | INTERMEDIATE CLASSIFICATION | MINOR CLASSIFICATION |
|---|---|---|
| | StatusMessenger | |
| | SETTING OF INTERNET SERVICES | |
| | ACTIVATION OF PORT | |
| | SETTING OF PORT | ETHERNET |
| | | WIRELESS |
| | SETTING OF PROTOCOL | TOP/IP |
| | | LPD |
| | | Port9100 |
| | | IPP |
| | | FTP |
| | | SMB |
| | | NetWare |
| | | EtherTalk |
| | | Bonjour |
| | | SNMP |
| | | FTP CLIENT |
| | | SMB CLIENT |
| | | MAIL |
| | | SNTP CLIENT |
| | | HTTP |
| PRINTER | RESTRICTION OF PRINT USER | |
| | SETTING OF LOGICAL PRINTER | (PAGE OF EACH INSTALLED PDL) |
| MAINTENANCE | ERROR HISTORY | |
| SUPPORT | CUSTOMER SUPPORT | |
| HELP | — | — |

FIG. 4

Content Operation Restriction

| Name of Content | Content Operation Restriction Mode |
|---|---|
| State | * Not restricted ▶ |
| Job | * Restricted (Allowed only to Apparatus Administrator) ▶ |
| Registration/Change | * Restricted (Allowed only to Apparatus Administrator) ▶ |
| Property | * Restricted (Allowed only to Apparatus Administrator) ▶ |
| Maintenance | * Not restricted ▶ |
| Support | * Not restricted ▶ |

[Apply New Setting]   [Return to Original]

INFORMATION PROCESSING APPARATUS, INFORMATION PROCESSING SYSTEM, IMAGE FORMING APPARATUS, IMAGE FORMING SYSTEM, AND COMPUTER READABLE MEDIUM

CROSS-REFERENCE TO RELATED APPLICATIONS

This Application is a Continuation Application of U.S. application Ser. No. 12/100,432 filed Apr. 10, 2008, which claims the benefit of priority from Japanese Patent Application No. 2007-250190 filed Sep. 26, 2007, the disclosures of which are incorporated herein in their entirety by reference.

BACKGROUND

1. Technical Field

The present invention relates to an information processing apparatus, an information processing system, an image forming apparatus, an image forming system, and a computer readable medium.

2. Related Art

In an information processing apparatus such as a server or a personal computer, or an image forming apparatus such as a printer having a network function, various information is stored in a storage section such as a memory or a hard disk drive.

In such information, it is often that information which is allowed for all users to perform browsing, various settings, and the like, and that which is allowed only for a part of users or the administrator to perform browsing, various settings, and the like mixedly exist.

Therefore, many techniques for restricting processes such as browsing of information, various settings, and the like have been proposed.

SUMMARY

According to an aspect of the present invention, an information processing apparatus includes: an information storage that stores information; a request accepting section that accepts a predetermined request for the information; a setting section that, for each of the information, sets whether the predetermined request is allowed; a setting storage that stores a setting by the setting section; a determining section that, with respect to the information corresponding to a request accepted by the request accepting section, reads out a corresponding setting from the setting storage, and that determines allowance/non-allowance of the predetermined request; and a process executing section that, in a case where the determining section determines allowance of the predetermined request, executes a process corresponding to the predetermined request on the information.

BRIEF DESCRIPTION OF THE DRAWINGS

Exemplary embodiment of the present invention will be described in detail based on the following figures, wherein:

FIG. 1 is a block diagram showing the configuration of an information processing system S1 which is a first exemplary embodiment;

FIG. 2 is a view illustrating an example of classification of contents;

FIG. 3 is a view illustrating an example of classification of contents;

FIG. 4 is a view illustrating an example of setting of content operation restriction;

DETAILED DESCRIPTION

Figure 5:
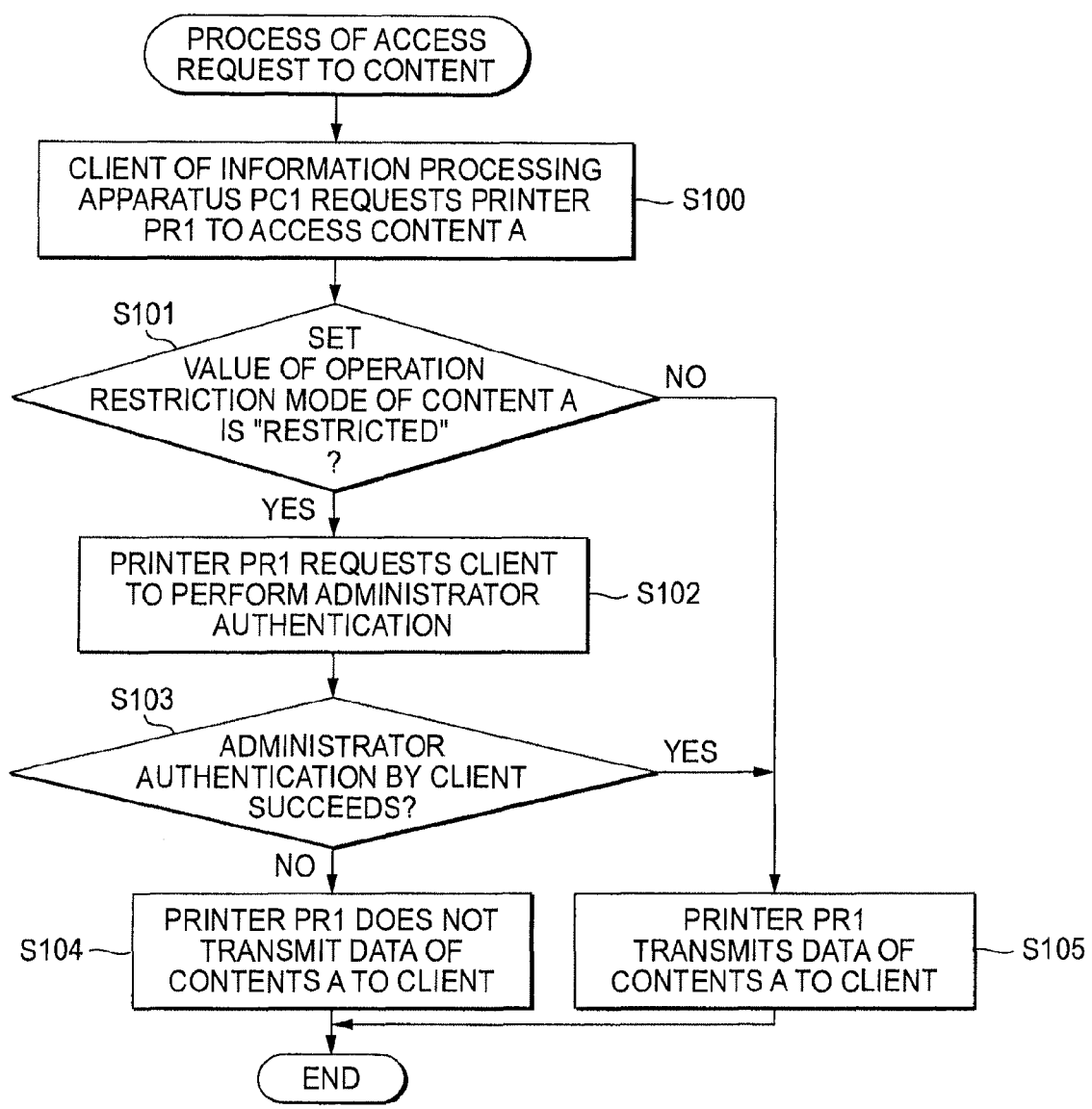
FIG. 5 is a flowchart showing the procedure of a process of an access request to content.

Hereinafter, exemplary embodiments which are examples of the invention will be described in detail with reference to the accompanying drawings. In the drawings, the identical members are designated by the same reference numerals, and duplicated description will be omitted. In the following, the best mode for carrying out the invention will be described, and hence the invention is not restricted to the mode.

First Exemplary Embodiment

Referring to FIGS. 1 to 13, an information processing system S1 which is a first exemplary embodiment of the invention will be described.

FIG. 1 is a block diagram showing the configuration of the image forming system S1 which is the first exemplary embodiment.

As shown in FIG. 1, the image forming system S1 is configured by: a printer PR1 which is a kind of information processing apparatus (or image forming apparatus) having a network connection function through a network N such as a LAN or the Internet; and an information processing apparatus PC1 for an administrator and configured by a personal computer or the like.

In the exemplary embodiment, one printer PR1 and one information processing apparatus PC1 are connected. The exemplary embodiment is not restricted to this, and two or more printers and two or more information processing apparatuses may be connected. An image inputting apparatus (such as a scanner) having a network function may be additionally connected.

In the exemplary embodiment, the type of the printer PR1 is not particularly limited, and may be any one of printers having a network connection function such as a laser printer, a full-color printer, or an inkjet printer.

The information processing apparatus PC1 is provided with a web browser which operates on a usual OS (Operating System), so that the apparatus can access the printer PR1 through the network N to perform browsing of web contents (web pages), predetermined setting, etc.

Although not particularly restricted, for example, the configuration of the information processing apparatus PC1 comprises a keyboard and a mouse as inputting means, and a liquid crystal display device as displaying means.

The printer PR1 comprises a configuration for realizing a printing function including a sheet conveying mechanism, a printer engine (image forming section), and the like. A usual configuration may be employed, and therefore its description is omitted.

FIG. 1 shows only the configuration of the printer PR1 required for implementing the invention.

As shown in FIG. 1, the printer PR1 comprises: a communicating portion 100 configured by a network interface or the like which is connected to the network N to transmit and receive data (information) such as various requests to and from the information processing apparatus PC1 and the like; an embedded web server (hereinafter, abbreviated as EWS) 101 serving as a request accepting section; a nonvolatile memory 102 which stores administrator information and the like; and a content material storing portion 104 which stores content materials (various information) for producing contents (web pages).

The term "EWS" means not only a web server installed in a printer (printing device), but also web servers installed in various devices. For example, an EWS is installed in a printer or the like as in the exemplary embodiment, or in a home ADSL router and the like. An EWS can access a web server installed in such a device from a web browser (web client) installed in a client computer, to set the values of various parameters or display communication history information.

In the exemplary embodiment, the EWS 101 comprises: an authenticating portion 200 which authenticates an administrator of the printer PR1 or the like by means of matching of an ID code or a password; a determining portion 201 which determines whether the display of a content (information or a web page) requested (in the exemplary embodiment, this is referred to as a content display request) by the apparatus PC1 is allowed or not; and a content producing portion 202 which produces a content (information or a web page) from various information stored in the content material storing portion 104.

The nonvolatile memory 102 stores administrator information D1, and a content operation restriction management table D2 which defines restrictions on a content operation (content process).

In the content operation restriction management table D2, setting information indicating, for example, whether the display of each content is allowed or not is stored in the form of a table (a detailed example will be described later).

The content producing portion 202 collects various data, and, based on the data, produces contents (HTML file (web page)).

The various data which are used as materials of contents are stored in different places depending on their contents, and therefore are not specified in FIG. 1. For example, job history information is stored in the nonvolatile memory 102 in order that the information is not erased even when the power of the printer PR1 is turned off. In the case where the requested content is "job history", the EWS 101 obtains job history information through a job history information management module. In the case where a content is event information, the content is stored in the nonvolatile memory 102. In the case where the requested content is "event information", the EWS 101 obtains event information through an event information management module.

Referring to comments (1) to (9) in FIG. 1, the flow of the operation of the information processing system S1 will be described.

First, a content display request is sent to the printer PR1 through the web browser of the information processing apparatus PC1 (1).

The determining portion 201 of the EWS 101 of the printer PR1 refers the content operation restriction management table D2 on the basis of the content display request, and checks the set content (set value) of the corresponding content (2).

If it is determined that the display of the corresponding content is allowed, an access of a web browser corresponding to the content is allowed, and a display, setting, and the like of the content are performed on the web browser of the information processing apparatus PC1.

By contrast, if it is determined that the display of the corresponding content is not allowed, the determining portion 201 notifies the authenticating portion 200 that authentication of an administrator is necessary (3).

On the basis of the notification, the authenticating portion 200 requests the information processing apparatus PC1 to input administrator information.

On the basis of the request, the user of the information processing apparatus PC1 inputs administrator information (for example, the apparatus administrator ID) through the keyboard or the like (5). It is a matter of course that, when the user does not have an administrator privilege, the apparatus administrator ID or the like cannot be input. In this case, therefore, the content display request is abandoned at this timing.

Also when the authentication in the authenticating portion 200 fails (for example, the apparatus administrator ID is erroneously input, or an invalid apparatus administrator ID is input by an unauthorized user), the content display request is not allowed.

According to the configuration, it is possible to prevent a person who has no privilege of accessing a corresponding content (i.e., a user other than the administrator, or a person who attempts an unauthorized access) from browsing and setting the content, and the security of the printer PR1 can be improved.

By contrast, the authenticating portion 200 reads out the administrator information D1 (6), and performs matching between the information and the input apparatus administrator ID. If matching is attained, an authentication success notification is sent to the determining portion 201 (7).

On the basis of the notification, the determining portion 201 obtains a content (information) corresponding to the request, from the content material storing portion 104 (8), the content producing portion 202 produces a web page including the content, and a state where the web page can be browsed or set through the web browser of the information processing apparatus PC1 is set (9).

Therefore, the user of the information processing apparatus PC1 can browse or set a desired content (information) through the web browser, on the basis of the content display request.

Next, referring to FIGS. 2 and 3, an example of classification of contents (information) will be described.

In this example, contents (information) are stored with classified into groups of three hierarchies or major, intermediate, and minor classifications.

The number of classifications may be increased or decreased in accordance with the kinds or use of contents.

In the example shown in FIGS. 2 and 3, the group of the major classifications stores "print, scan, facsimile, service set up, . . . ".

The group of the intermediate classifications dependent to the group of the major classifications stores setting items related to operations such as "execution, suspension, and abort", and items such as "device information, event information", "port setting", and "protocol setting".

The group of the minor classifications dependent to the group of the intermediate classifications stores, for example, dependent to "device information" of the intermediate classifications, setting items such as "sheet tray, discharge tray, cover, consumables", and, dependent to "setting of protocol" of the intermediate classifications, setting items such as "TCP/IP, LPD, Port9000, . . . "

Next, referring to Table 1 and FIG. 4, a configuration example of the content operation restriction management table D2 of the nonvolatile memory 102 of the printer PR1 will be described.

TABLE 1

Content operation restriction management table

| Display item | Display content | Inputting method (number of characters × number of lines)/input restriction/display restriction |
|---|---|---|
| Restriction on content operation | Name of table | — |
| Name of content | Name of content classified as major classification Depend on installed functions | Selection boxes/ alternatives are as follows: 1. Not restricted 2. Restricted (allowed only to administrator) |

As shown in Table 1 and FIG. 4, "restricted" or "not restricted" is set for each content.

In the example shown in FIG. 4, with respect to the group of the major classifications (state, job, property, maintenance, support) shown in FIGS. 2 and 3, "restricted" or "not restricted" is set. These setting contents are reflected in the intermediate and minor classifications dependent to each group of the major classifications.

Therefore, the work of setting "restricted" or "not restricted" in each of items of the intermediate and minor classifications in which the number of items is relatively large can be omitted, and the contents (information) can be managed efficiently.

Table 2 shows "content operation restriction mode" which is seen from the viewpoint of a function that can be used by a usual user and the administrator.

TABLE 2

Meaning of each value of content operation restriction mode

| Restriction mode of tab operation | Type of user | Operation requested by client | |
|---|---|---|---|
| | | Display | Setting (execution) |
| Not restricted | Usual user (CO) | Able | Disable |
| | Administrator (KO) | Able | Able |
| Restricted (allowed only to apparatus administrator) | Usual user (CO) | Disable | Disable |
| | Administrator (KO) | Able | Able |

In Table 2, "CO" is an abbreviation of "Casual Operator", and "KO" is an abbreviation of "Key Operator".

Table 3 shows "content operation restriction mode" which is seen from the viewpoint of whether administrator authentication is requested or not.

TABLE 3

Case where administrator authentication is requested

| Restriction mode of content operation | Operation requested by client | |
|---|---|---|
| | Display | Setting (execution) |
| Not restricted | Administrator authentication is not requested | Administrator authentication is requested |
| Restricted (allowed only to apparatus administrator) | Administrator authentication is requested | Administrator authentication is requested |

Next, with reference to the flowchart of FIG. 5, the procedure of the process of an access request to a content which is executed in the information processing system S1 of the exemplary embodiment will be described.

In the example shown in FIG. 5, it is assumed that content A is to be accessed.

When the process is started, first, the information processing apparatus PC1 (client) requests in step S100 the printer PR1 to access content A, and the process then proceeds to step S101.

In step S101, it is determined whether the set value of the operation restriction mode of content A is "restricted" or not.

If the determination result is "No", the process proceeds to step S105 in which the printer PR1 transmits data of content A to the information processing apparatus PC1 (client).

In this case, as described above, the information processing apparatus PC1 (client) may obtain data by accessing a web page including content A produced by the content producing portion 202 of the EWS 101 of the printer PR1, through the web browser.

If "Yes" is determined in step S101, the process proceeds to step S102 in which the printer PR1 requests the information processing apparatus PC1 (client) to perform administrator authentication, and the process then proceeds to step S103.

In step S103, authentication is performed on the basis of the administrator information (apparatus administrator ID or the like) input in the information processing apparatus PC1. If the authentication succeeds, the process proceeds to step S105 in which the printer PR1 transmits data of content A to the information processing apparatus PC1 (client).

In this case, as in the same manner as the case described above, the information processing apparatus PC1 (client) may obtain data by accessing a web page including content A produced by the content producing portion 202 of the EWS 101 of the printer PR1, through the web browser.

If it is determined in step S103 that the administrator authentication fails, the process proceeds to step S104, and the process is ended without transmitting data of content A.

As described above, if it is authenticated that the request is issued from a person who has the privilege of accessing content A or the administrator, the access to content A is allowed. Therefore, it is possible to prevent a person who has no privilege of access (i.e., a user other than the administrator, or a person who attempts an unauthorized access) from accessing content A, and hence the security of the printer PR1 can be improved.

It is a matter of course that other contents can be similarly processed by the process of requesting an access to a content shown in FIG. 5. Also when the request content is a request other than an access request, such as a request for changing the setting a predetermined content (information), or a print request, the request can be processed in a similar procedure.

Next, an example of a case where, with respect to not only the display but also the setting (execution), restriction can be made for each content will be described.

Figure 6:
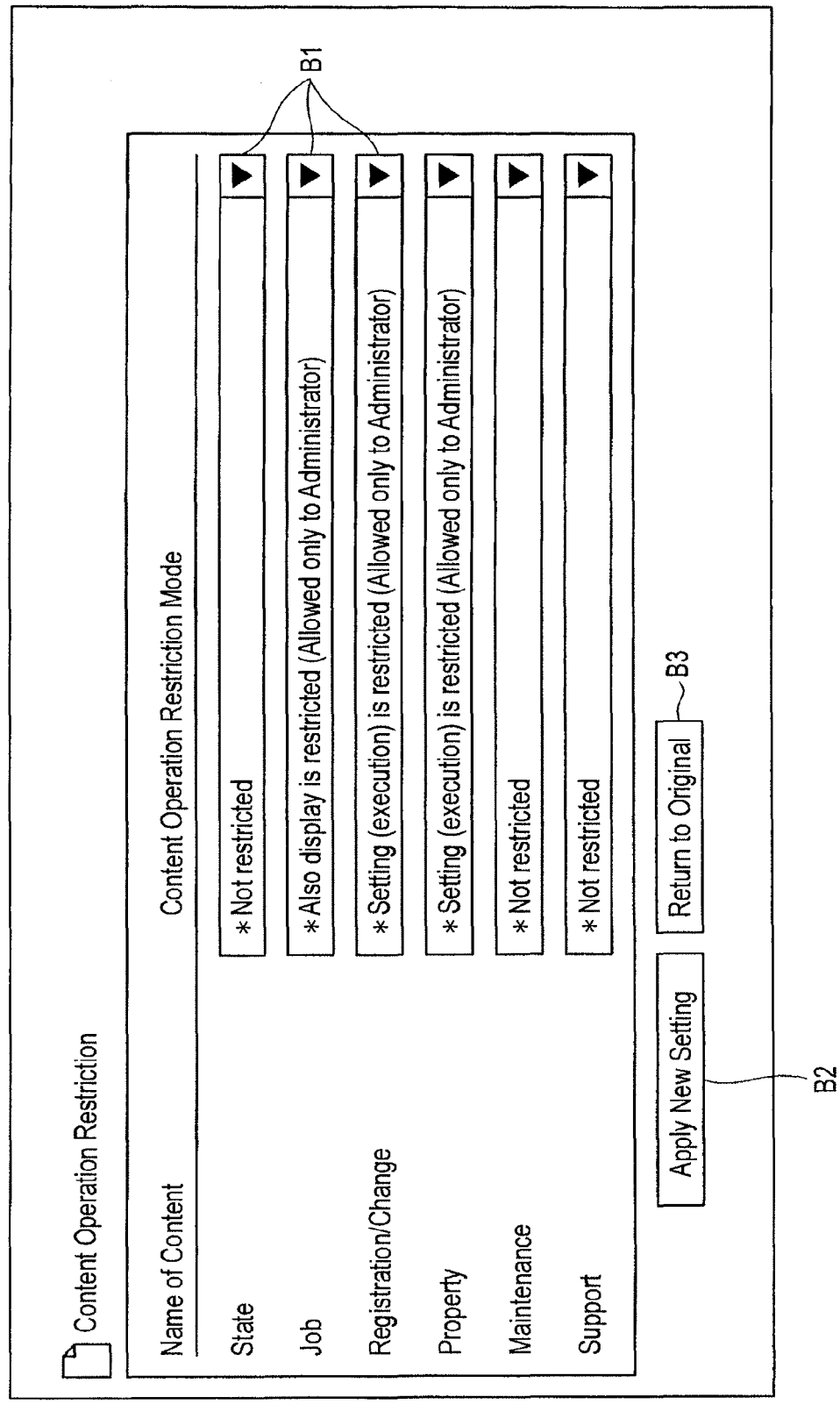
FIG. 6 is a view illustrating an example of setting of content operation restriction.

Table 4 and FIG. 6 show an example in which restriction in the case where contents are operated is managed.

TABLE 4

Content operation restriction management table 2

| Display item | Display content | Inputting method (number of characters × number of lines)/input restriction/display restriction |
|---|---|---|
| Restriction on content operation | Name of table | — |
| Name of content | Name of content classified as major classification Depend on installed functions | Selection boxes/alternatives are as follows: 1. Not restricted 2. Setting (execution) is restricted (allowed only to administrator) 3. Also display is restricted (allowed only to administrator) |

In the example shown in Table 4 and FIG. 6, three alternatives of the setting or "Not restricted", "Setting (execution) is restricted (allowed only to administrator)", and "Also display is restricted (allowed only to administrator)" are prepared.

In a setting screen such as shown in FIG. 6, with respect to each content, a button B1 is operated to select one of the three kinds of settings.

When the setting is to be applied, a button B2 is clicked, and, when the setting is to be returned to the default setting or the state before the setting change, a button B3 is clicked.

Table 5 shows "content operation restriction mode" which is seen from the viewpoint of a function that can be used by a usual user and the administrator.

Table 6 shows "content operation restriction mode" which is seen from the viewpoint of whether administrator authentication is requested or not.

TABLE 5

Meaning of each value of content operation restriction mode

| Restriction mode of tab operation | Type of user | Operation requested by client | |
|---|---|---|---|
| | | Display | Setting (execution) |
| Not restricted | Usual user (CO) Apparatus administrator (KO) | Able Able | Able Able |

TABLE 5-continued

Meaning of each value of content operation restriction mode

| Restriction mode of tab operation | Type of user | Operation requested by client | |
|---|---|---|---|
| | | Display | Setting (execution) |
| Setting (execution) is restricted (allowed only to apparatus administrator) | Usual user (CO) Apparatus administrator (KO) | Able Able | Disable Able |
| Also display is restricted (allowed only to apparatus administrator) | Usual user (CO) Apparatus administrator (KO) | Disable Able | Disable Able |

TABLE 6

Case where administrator authentication is requested

| Restriction mode of content operation | Operation requested by client | |
|---|---|---|
| | Display | Setting (execution) |
| Not restricted | Administrator authentication is not requested | Administrator authentication is not requested |
| Setting (execution) is restricted (allowed only to apparatus administrator) | Administrator authentication is not requested | Administrator authentication is requested |
| Also display is restricted (allowed only to apparatus administrator) | Administrator authentication is requested | Administrator authentication is requested |

Next, with reference to the flowchart of FIG. 7, the procedure of the process of a display request to a content which is executed in the information processing system S1 of the exemplary embodiment will be described.

In step S200, the information processing apparatus PC1 (client) requests the printer PR1 to display content A, and the process then proceeds to step S201.

In step S201, it is determined whether the set value of the operation restriction mode of content A is "not restricted", "setting (execution) is restricted (allowed only to administrator)", or "also display is restricted (allowed only to administrator)". If it is determined that the set value is "not restricted" or "setting (execution) is restricted (allowed only to administrator)", the process proceeds to step S205 in which the printer PR1 transmits data of content A to the information processing apparatus PC1 (client) (i.e., the display is allowed). In the case where the set value is "setting (execution) is restricted (allowed only to administrator)", it is a matter of course that a usual user can perform only the display (browsing), and cannot perform setting of content A and the like. By contrast, in the case where the set value is "not restricted", a usual user can perform not only the display of content A, but also setting. execution of the process, and the like.

In this case, as described above, the information processing apparatus PC1 (client) may obtain data or perform an operation by accessing a web page including content A produced by the content producing portion 202 of the EWS 101 of the printer PR1, through the web browser.

If it is determined in step S201 that the set value is "also display is restricted (allowed only to administrator)", the process proceeds to step S202 in which the printer PR1 requests the information processing apparatus PC1 (client) to perform administrator authentication, and the process then proceeds to step S203.

In step S203, authentication is performed on the basis of the administrator information (apparatus administrator ID or the like) input in the information processing apparatus PC1. If the authentication succeeds, the process proceeds to step S205 in which the printer PR1 transmits data of content A to the information processing apparatus PC1 (client) (that is, for the administrator, the display is allowed).

In this case, as in the same manner as the case described above, the information processing apparatus PC1 (client) may obtain data by accessing a web page including content A produced by the content producing portion 202 of the EWS 101 of the printer PR1, through the web browser.

If it is determined in step S203 that the administrator authentication fails, the process proceeds to step S204, and the process is ended without transmitting data of content A.

As described above, in accordance with the set value of content A, it is possible to restrict allowance/non-allowance of display, and contents of an allowed process. Therefore, the security of the printer PR1 can be further improved.

Figure 7:
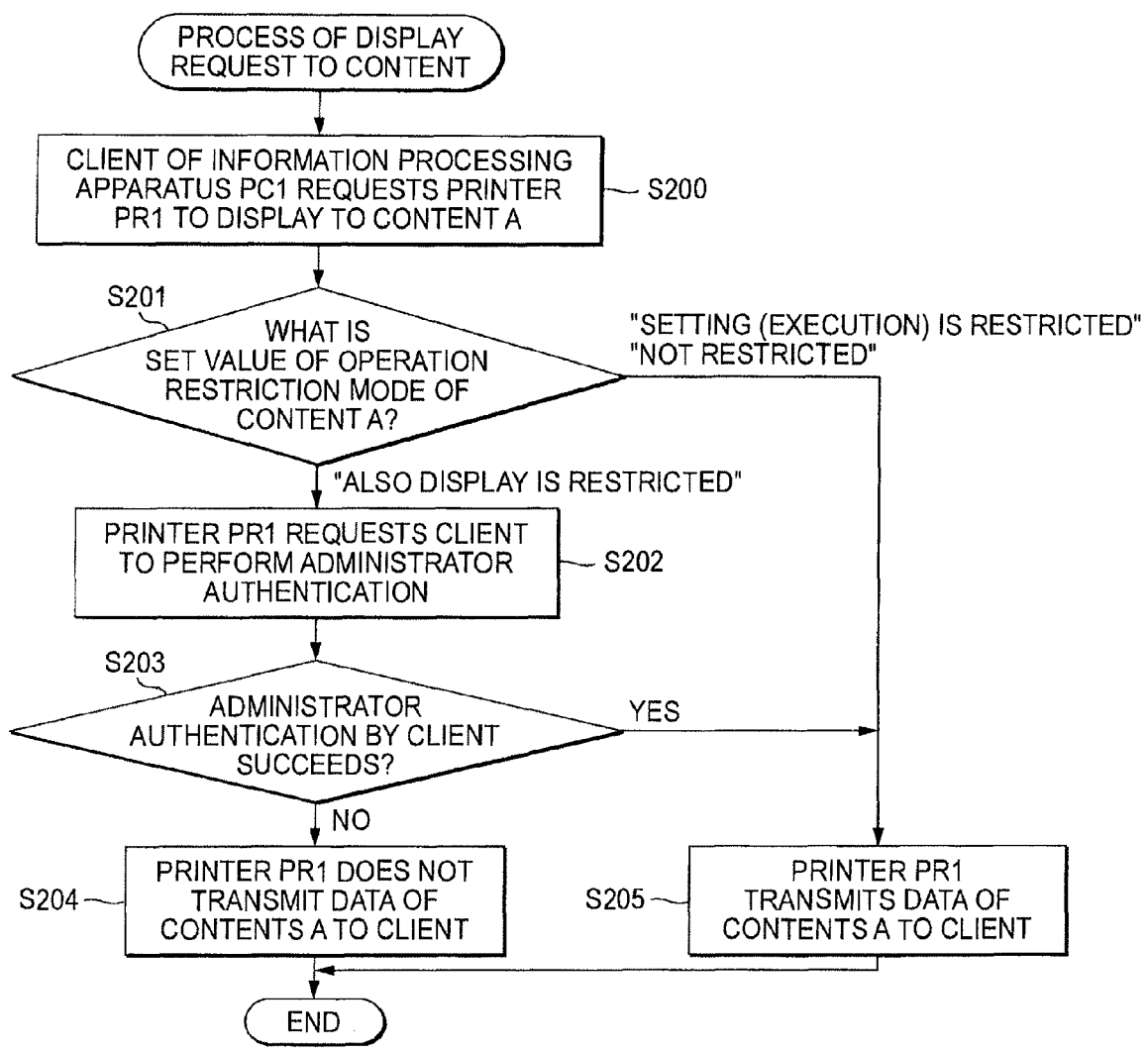
FIG. 7 is a flowchart showing the procedure of a process of a display request to content.

It is a matter of course that contents other than content A can be similarly processed by the process of a display request to a content shown in FIG. 7.

Next, with reference to the flowchart of FIG. 8, the procedure of the process of a request of setting (execution) to a content which is executed in the information processing system S1 of the exemplary embodiment will be described.

In step S300, the information processing apparatus PC1 (client) requests the printer PR1 to perform setting (execution) on content A, and the process then proceeds to step S301.

In step S301, it is determined whether the set value of the operation restriction mode of content A is "not restricted", "setting (execution) is restricted (allowed only to administrator)", or "also display is restricted (allowed only to administrator)". If it is determined that the set value is "not restricted", the process proceeds to step S305 in which the printer PR1 transmits data of content A to the information processing apparatus PC1 (client) (i.e., the display and setting (execution) are allowed).

In this case, as described above, the information processing apparatus PC1 (client) may obtain data or perform setting (execution) by accessing a web page including content A produced by the content producing portion 202 of the EWS 101 of the printer PR1, through the web browser.

If it is determined in step S301 that the set value is "setting (execution) is restricted (allowed only to administrator)" or "also display is restricted (allowed only to administrator)", the process proceeds to step S302 in which the printer PR1 requests the information processing apparatus PC1 (client) to perform administrator authentication, and the process then proceeds to step S303.

In step S303, authentication is performed on the basis of the administrator information (apparatus administrator ID or the like) input in the information processing apparatus PC1. If the authentication succeeds, the process proceeds to step S305 in which the printer PR1 transmits data of content A to the information processing apparatus PC1 (client) (that is, for the administrator, the display and setting (execution) are allowed).

In this case, as in the same manner as the case described above, the information processing apparatus PC1 (client) may obtain data and perform operations such as setting by accessing a web page including content A produced by the content producing portion 202 of the EWS 101 of the printer PR1, through the web browser.

If it is determined in step S303 that the administrator authentication fails, the process proceeds to step S304, and the process is ended without transmitting data of content A.

As described above, in accordance with the set value of content A, it is possible to restrict setting (execution). Therefore, the security of the printer PR1 can be further improved.

Figure 8:
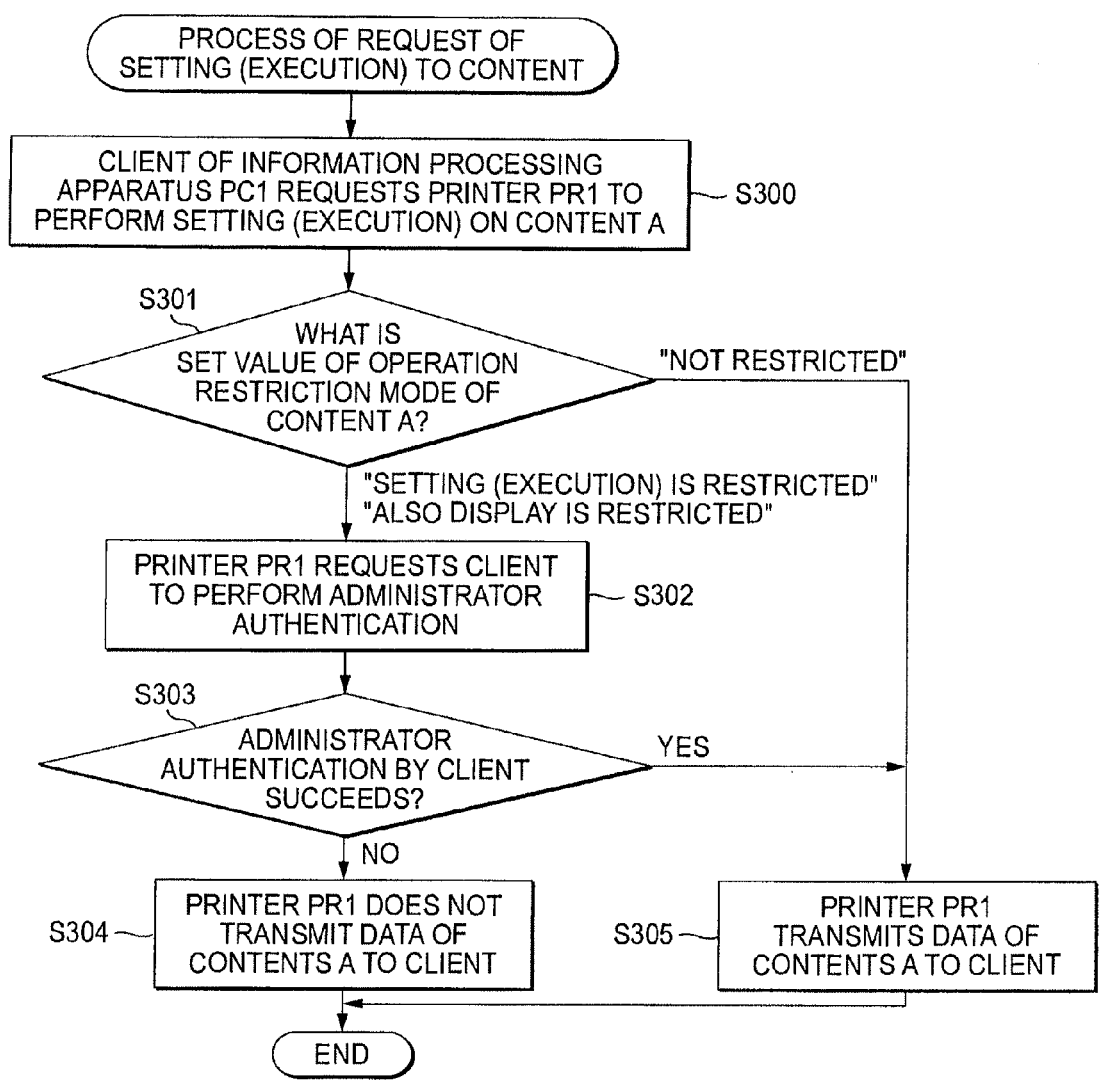
FIG. 8 is a flowchart showing the procedure of a process of a request of setting (execution) to content.

It is a matter of course that contents other than content A can be similarly processed by the process of a request of setting (execution) to a content shown in FIG. 8.

Next, an example of a case where the number of the user classifications is increased to three or more will be described.

Figure 9:
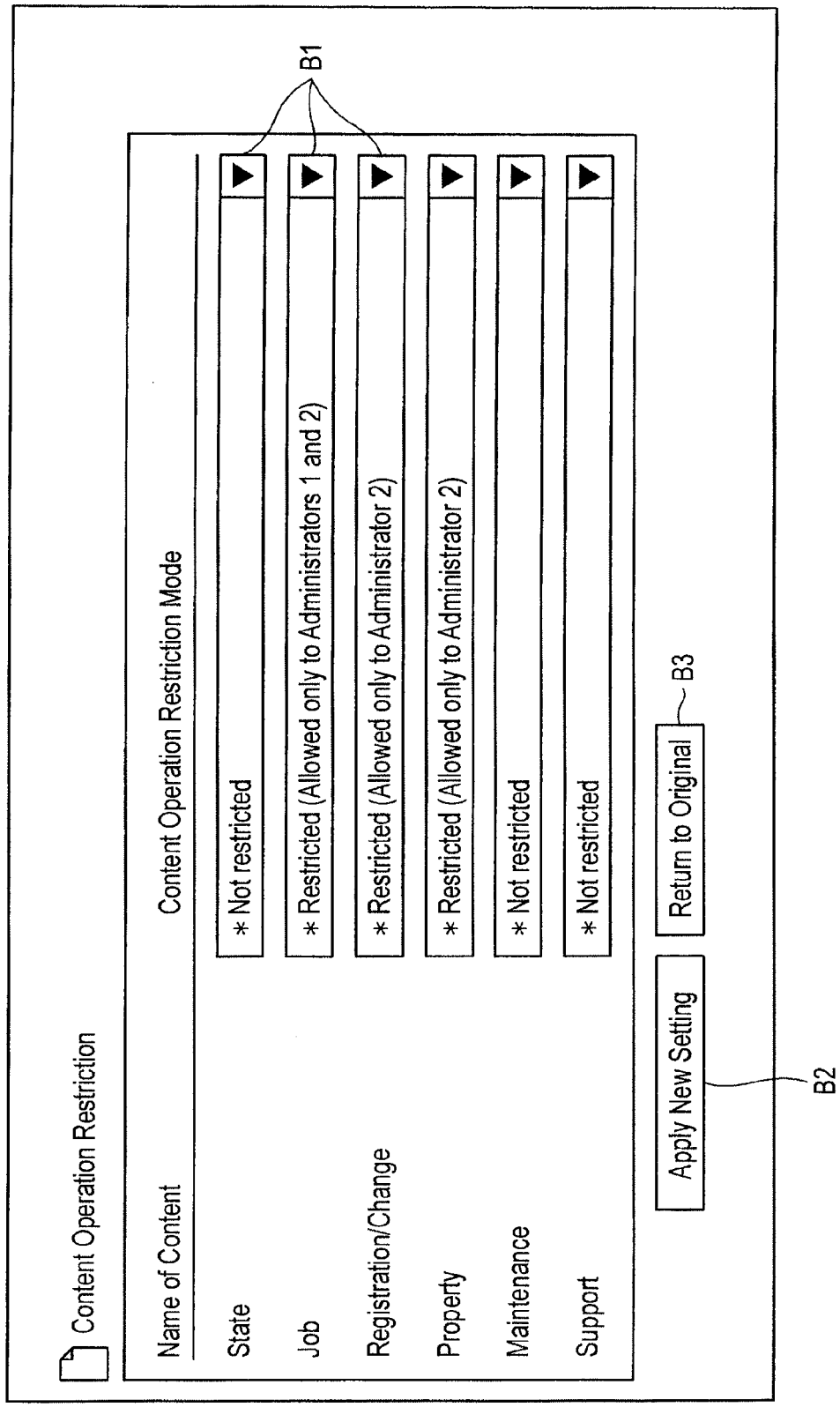
FIG. 9 is a view illustrating an example of setting of content operation restriction.

Table 7 and FIG. 9 show an example in which restriction in the case where contents are operated is managed.

TABLE 7

Content operation restriction management table

| Display item | Display content | Inputting method (number of characters × number of lines)/input restriction/display restriction |
|---|---|---|
| Restriction on content operation | Name of table | — |
| Name of content | Name of content classified as major classification Depend on installed functions | Selection boxes/ alternatives are as follows: 1. Not restricted 2. Restricted (allowed only to administrators 1 and 2) 3. Restricted (allowed only to administrator 2) |

In the example shown in Table 7 and FIG. 9, three alternatives of the setting or "Not restricted", "Restricted (allowed only to administrators 1 and 2)", and "Restricted (allowed only to administrator 2)" are prepared.

In a setting screen such as shown in FIG. 9, with respect to each content, the button B1 is operated to select one of the three kinds of settings.

When the setting is to be applied, the button B2 is clicked, and, when the setting is to be returned to the default setting or the state before the setting change, the button B3 is clicked.

Table 8 shows "content operation restriction mode" which is seen from the viewpoint of a function that can be used by a usual user and the administrator.

TABLE 8

| Restriction mode of tab operation | Type of user | Operation requested by client | |
|---|---|---|---|
| | | Display | Setting (execution) |
| Not restricted | Usual user (CO) | Able | Able |
| | Administrator 1 (KO) | Able | Able |
| | Administrator 2 (CE) | Able | Able |
| Restricted (allowed only to administrators 1 and 2) | Usual user (CO) | Disable | Disable |
| | Administrator 1 (KO) | Able | Able |
| | Administrator 2 (CE) | Able | Able |
| Restricted (allowed only to administrator 2) | Usual user (CO) | Disable | Disable |
| | Administrator 1 (KO) | Disable | Disable |
| | Administrator 2 (CE) | Able | Able |

In Table 8, "CE" corresponding to administrator 2 is an abbreviation of "Customer Engineer".

Table 9 shows "content operation restriction mode" which is seen from the viewpoint of whether administrator authentication is requested or not.

TABLE 9

Case where administrator authentication is requested

| Restriction mode of content operation | Operation requested by client | |
|---|---|---|
| | Display | Setting (execution) |
| Not restricted | Administrator authentication is not requested | Administrator authentication is requested |
| Restricted (allowed only to administrators 1 and 2) | Administrator authentication is requested | Administrator authentication is requested |
| Restricted (allowed only to administrator 2) | Administrator authentication is requested | Administrator authentication is requested |

Next, with reference to the flowchart of FIG. 10, the procedure of the process of an access request to a content which is executed in the information processing system S1 of the exemplary embodiment will be described.

In step S400, the information processing apparatus PC1 (client) requests the printer PR1 to access content A, and the process then proceeds to step S401.

In step S401, it is determined whether the set value of the operation restriction mode of content A is "not restricted", "restricted (allowed only to administrators 1 and 2)", or "restricted (allowed only to administrator 2)". If it is determined that the set value is "not restricted", the process proceeds to step S405 in which the printer PR1 transmits data of content A to the information processing apparatus PC1 (client) (i.e., the access is allowed).

In this case, as described above, the information processing apparatus PC1 (client) may obtain data by accessing a web page including content A produced by the content producing portion 202 of the EWS 101 of the printer PR1, through the web browser.

If it is determined in step S401 that the set value is "restricted (allowed only to administrators 1 and 2)" or "restricted (allowed only to administrator 2)", the process proceeds to step S402 in which the printer PR1 requests the information processing apparatus PC1 (client) to perform administrator authentication, and the process then proceeds to step S403.

In step S403, authentication is performed on the basis of the administrator information (apparatus administrator ID or the like) input in the information processing apparatus PC1. If the authentication succeeds, the process proceeds to step S405 in which the printer PR1 transmits data of content A to the information processing apparatus PC1 (client) (that is, for administrator 1 or 2, the access is allowed).

In this case, as in the same manner as the case described above, the information processing apparatus PC1 (client) may obtain data by accessing a web page including content A produced by the content producing portion 202 of the EWS 101 of the printer PR1, through the web browser.

If it is determined in step S403 that the administrator authentication fails, the process proceeds to step S404, and the process is ended without transmitting data of content A.

As described above, in accordance with the set value of content A, it is possible to restrict the access of the user or an administrator to a content. Therefore, the security of the printer PR1 can be further improved.

Figure 10:
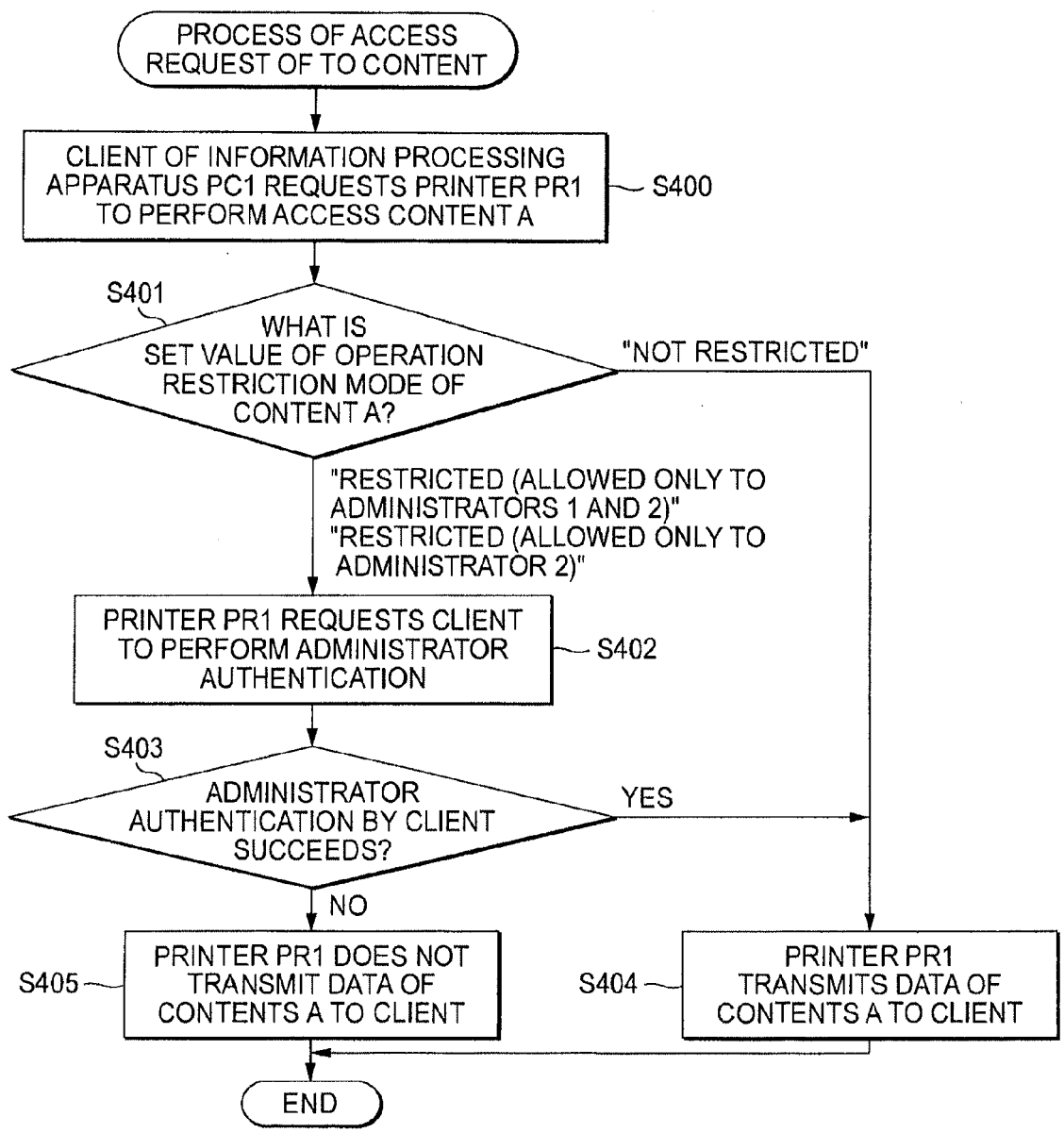
FIG. 10 is a flowchart showing the procedure of a process of an access request to content.

It is a matter of course that contents other than content A can be similarly processed by the process of an access request to a content shown in FIG. 10.

Next, an example of a case where the number of the user classifications are increased to three or more, and, with respect to not only the display but also the setting (execution), restriction can be made for each content will be described.

Figure 11:
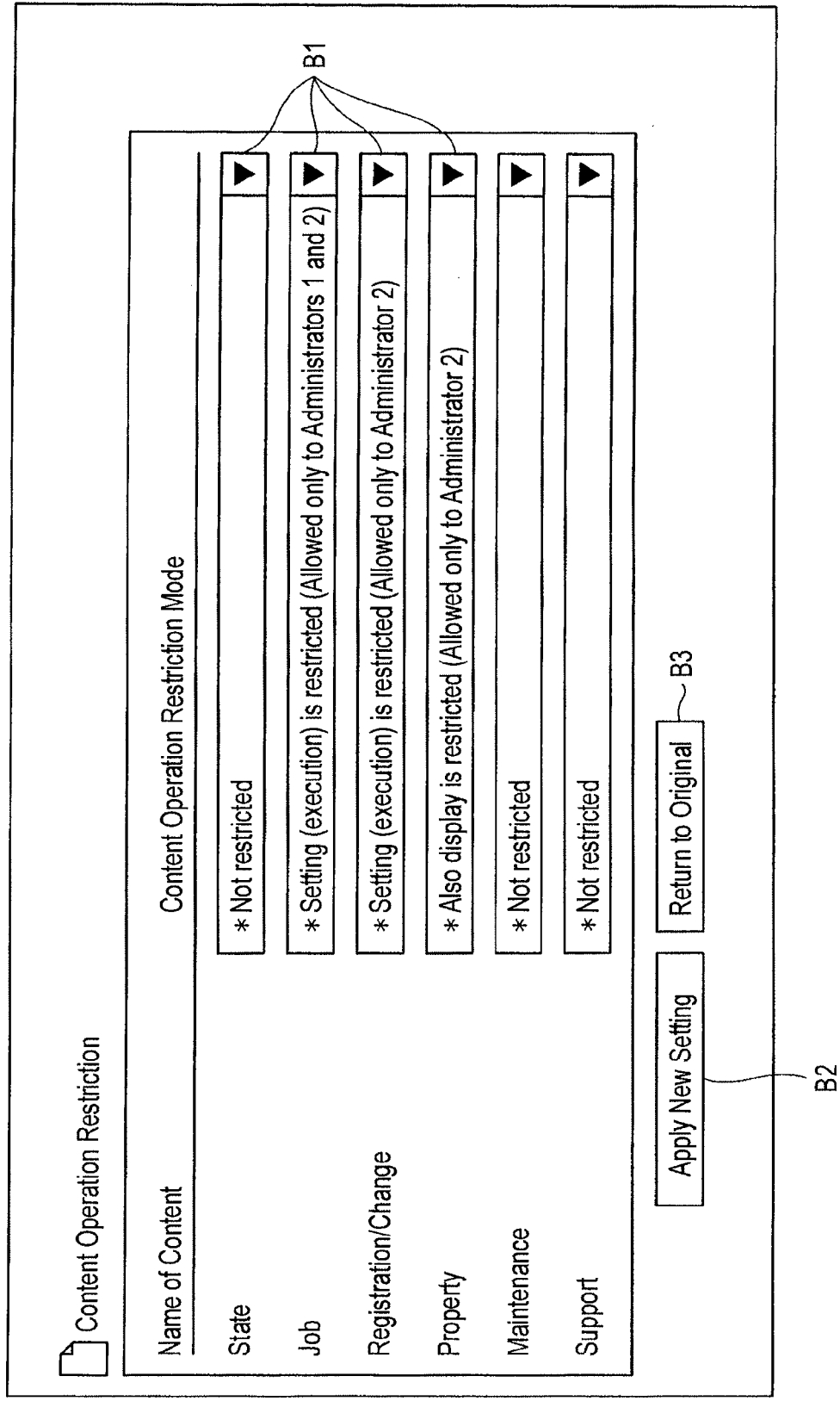
FIG. 11 is a view illustrating an example of setting of content operation restriction.

Table 10 and FIG. 11 show an example in which restriction in the case where contents are operated is managed.

TABLE 10

Content operation restriction management table

| Display item | Display content | Inputting method (number of characters × number of lines)/input restriction/display restriction |
|---|---|---|
| Restriction on content operation | Name of table | — |
| Name of content | Name of content classified as major classification Depend on installed functions | Selection boxes/alternatives are as follows: 1. Not restricted 2. Setting (execution) is restricted (allowed only to administrators 1 and 2) 3. Setting (execution) is restricted (allowed only to administrator 2) 4. Also display is restricted (allowed only to administrator 2) |

Figure 12:
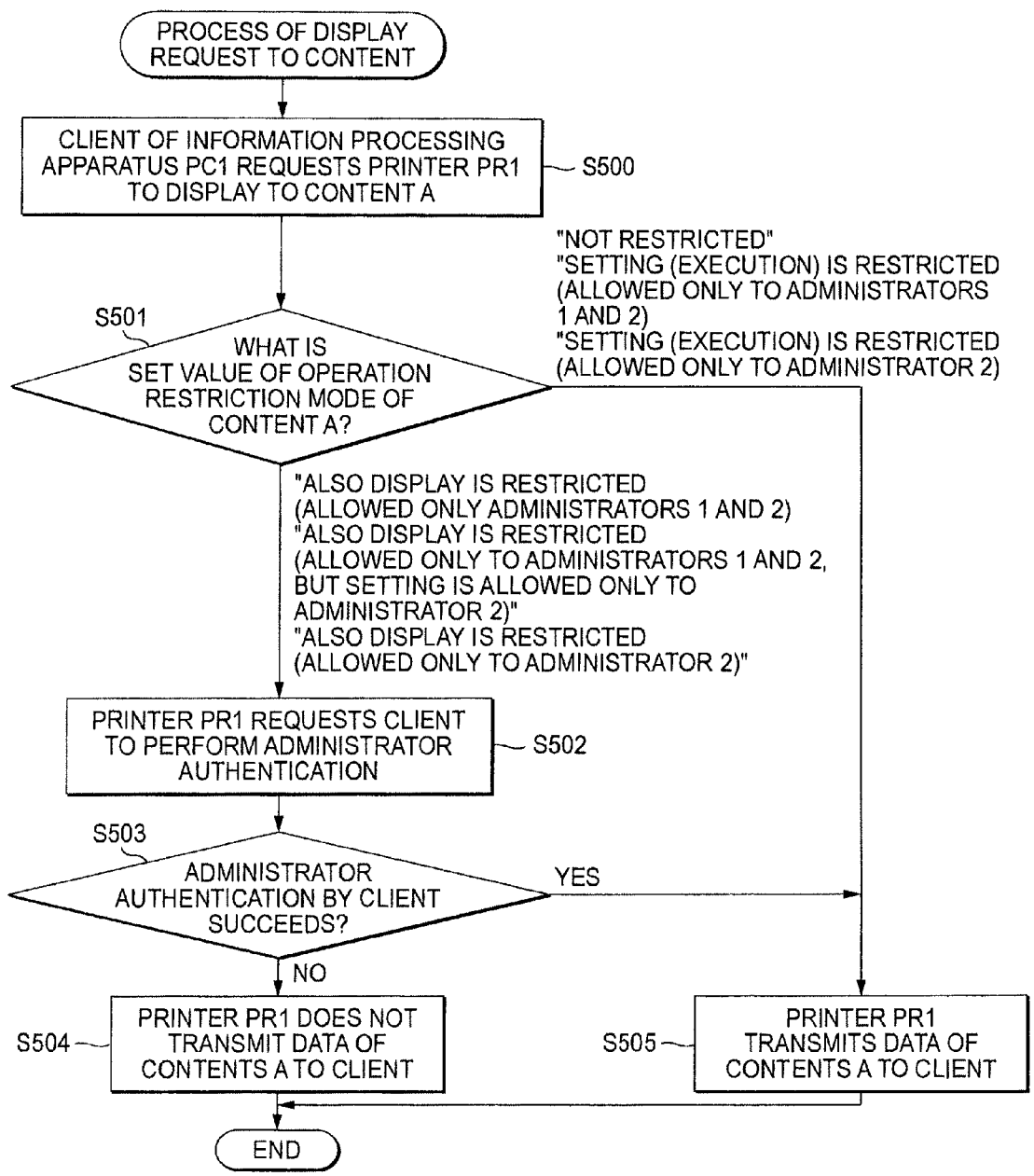
FIG. 12 is a flowchart showing the procedure of a process of a display access request to content.

In the example shown in Table 10 and FIGS. 11 and 12, six alternatives of the setting or "Not restricted", "Setting (execution) is restricted (allowed only to administrators 1 and 2)", "Setting (execution) is restricted (allowed only to administrator 2)", "Also display is restricted (allowed only to administrators 1 and 2)", "Also display is restricted (allowed only to administrators 1 and 2, but setting is allowed only to administrator 2)", and "Also display is restricted (allowed only to administrator 2)" are prepared.

In a setting screen such as shown in FIG. 11, with respect to each content, the button B1 is operated to select one of the fix kinds of settings.

When the setting is to be applied, the button B2 is clicked, and, when the setting is to be returned to the state before the setting change, the button B3 is clicked.

Table 11 shows "content operation restriction mode" which is seen from the viewpoint of a function that can be used by a usual user and the administrator.

Table 12 shows "content operation restriction mode" which is seen from the viewpoint of whether administrator authentication is requested or not.

TABLE 11

Meaning of each value of content operation restriction mode

| Restriction mode of tab operation | Type of user | Operation requested by client | |
|---|---|---|---|
| | | Display | Setting (execution) |
| Not restricted | Usual user (CO) | Able | Able |
| | Administrator 1 (KO) | Able | Able |
| | Administrator 2 (CE) | Able | Able |
| Setting (execution) is restricted (allowed only to administrators 1 and 2) | Usual user (CO) | Able | Disable |
| | Administrator 1 (KO) | Able | Able |
| | Administrator 2 (CE) | Able | Able |
| Setting (execution) is restricted (allowed only to administrator 2) | Usual user (CO) | Able | Disable |
| | Administrator 1 (KO) | Able | Disable |
| | Administrator 2 (CE) | Able | Able |
| Also display is restricted (allowed only to administrators 1 and 2) | Usual user (CO) | Disable | Disable |
| | Administrator 1 (KO) | Able | Able |
| | Administrator 2 (CE) | Able | Able |
| Also display is restricted (allowed only to administrators 1 and 2, but setting is allowed only to administrator 2) | Usual user (CO) | Disable | Disable |
| | Administrator 1 (KO) | Able | Disable |
| | Administrator 2 (CE) | Able | Able |
| Also display is restricted (allowed only to administrator 2) | Usual user (CO) | Disable | Disable |
| | Administrator 1 (KO) | Disable | Disable |
| | Administrator 2 (CE) | Able | Able |

TABLE 12

Case where administrator authentication is requested

| Restriction mode of content operation | Operation requested by client | |
|---|---|---|
| | Display | Setting (execution) |
| Not restricted | Administrator authentication is not requested | Administrator authentication is requested |
| Setting (execution) is restricted (allowed only to administrators 1 and 2) | Administrator authentication is requested | Administrator authentication is requested |
| Setting (execution) is restricted (allowed only to administrator 2) | Administrator authentication is requested | Administrator authentication is requested |
| Also display is restricted (allowed only to administrators 1 and 2) | Administrator authentication is requested | Administrator authentication is requested |
| Also display is restricted (allowed only to administrators 1 and 2, but setting is allowed only to administrator 2) | Administrator authentication is requested | Administrator authentication is requested |
| Also display is restricted (allowed only to administrator 2) | Administrator authentication is requested | Administrator authentication is requested |

Next, with reference to the flowchart of FIG. 12, another procedure of the process of a display request to a content which is executed in the information processing system S1 of the exemplary embodiment will be described.

In step S500, the information processing apparatus PC1 (client) requests the printer PR1 to display content A, and the process then proceeds to step S501.

In step S501, it is determined whether the set value of the operation restriction mode of content A is "not restricted", "setting (execution) is restricted (allowed only to administrators 1 and 2)", "setting (execution) is restricted (allowed only to administrator 2)", "also display is restricted (allowed only to administrators 1 and 2)", "also display is restricted (allowed only to administrators 1 and 2, but setting is allowed only to administrator 2)", or "also display is restricted (allowed only to administrator 2)". If it is determined that the set value is "not restricted", "setting (execution) is restricted (allowed only to administrators 1 and 2)", or "setting (execution) is restricted (allowed only to administrator 2)", the process proceeds to step S505 in which the printer PR1 transmits data of content A to the information processing apparatus PC1 (client) (i.e., the display is allowed).

In this case, as described above, the information processing apparatus PC1 (client) may obtain data by accessing a web page including content A produced by the content producing portion 202 of the EWS 101 of the printer PR1, through the web browser.

If it is determined in step S501 that the set value is "also display is restricted (allowed only to administrators 1 and 2)", "also display is restricted (allowed only to administrators 1 and 2, but setting is allowed only to administrator 2)", or "also display is restricted (allowed only to administrator 2)", the process proceeds to step S502 in which the printer PR1 requests the information processing apparatus PC1 (client) to perform administrator authentication, and the process then proceeds to step S503.

In step S503, authentication is performed on the basis of the administrator information (apparatus administrator ID or the like) input in the information processing apparatus PC1. If the authentication succeeds, the process proceeds to step S505 in which the printer PR1 transmits data of content A to the information processing apparatus PC1 (client) (that is, for the administrator 1 or 2, the access is allowed).

In this case, as in the same manner as the case described above, the information processing apparatus PC1 (client) may obtain data by accessing a web page including content A produced by the content producing portion 202 of the EWS 101 of the printer PR1, through the web browser.

If it is determined in step S503 that the administrator authentication fails, the process proceeds to step S504, and the process is ended without transmitting data of content A.

As described above, in accordance with the set value of content A, it is possible to restrict a content display request of the user and the administrator. Therefore, the security of the printer PR1 can be further improved.

It is a matter of course that contents other than content A can be similarly processed by the process of a display request to a content shown in FIG. 12.

Next, with reference to the flowchart of FIG. 13, another procedure of the process of a request of setting (execution) to a content which is executed in the information processing system S1 of the exemplary embodiment will be described.

In step S600, the information processing apparatus PC1 (client) requests the printer PR1 to perform setting (execution) on content A, and the process then proceeds to step S601.

In step S601, it is determined whether the set value of the operation restriction mode of content A is "not restricted", "setting (execution) is restricted (allowed only to administrators 1 and 2)", "setting (execution) is restricted (allowed only to administrator 2)", "also display is restricted (allowed only to administrators 1 and 2)", "also display is restricted (allowed only to administrators 1 and 2, but setting is allowed only to administrator 2)", or "also display is restricted (allowed only to administrator 2)". If it is determined that the set value is "not restricted", the process proceeds to step S605 in which the printer PR1 transmits data of content A to the information processing apparatus PC1 (client) (i.e., the setting (execution) is allowed).

In this case, as described above, the information processing apparatus PC1 (client) may obtain data or perform setting (execution) by accessing a web page including content A produced by the content producing portion 202 of the EWS 101 of the printer PR1, through the web browser.

If it is determined in step S601 that the set value is "setting (execution) is restricted (allowed only to administrators 1 and 2)", "setting (execution) is restricted (allowed only to administrator 2)", or the like other than "not restricted", the process proceeds to step S602 in which the printer PR1 requests the information processing apparatus PC1 (client) to perform administrator authentication, and the process then proceeds to step S603.

In step S603, authentication is performed on the basis of the administrator information (apparatus administrator ID or the like) input in the information processing apparatus PC1. If the authentication succeeds, the process proceeds to step S605 in which the printer PR1 transmits data of content A to the information processing apparatus PC1 (client) (that is, for administrator 1 or 2, the setting (execution) is allowed).

In this case, as in the same manner as the case described above, the information processing apparatus PC1 (client) may obtain data or perform setting (execution) by accessing a web page including content A produced by the content producing portion 202 of the EWS 101 of the printer PR1, through the web browser.

If it is determined in step S603 that the administrator authentication fails, the process proceeds to step S604, and the process is ended without transmitting data of content A.

As described above, in accordance with the set value of content A, it is possible to restrict the setting (execution) of a content of the user or an administrator. Therefore, the security of the printer PR1 can be further improved.

Figure 13:
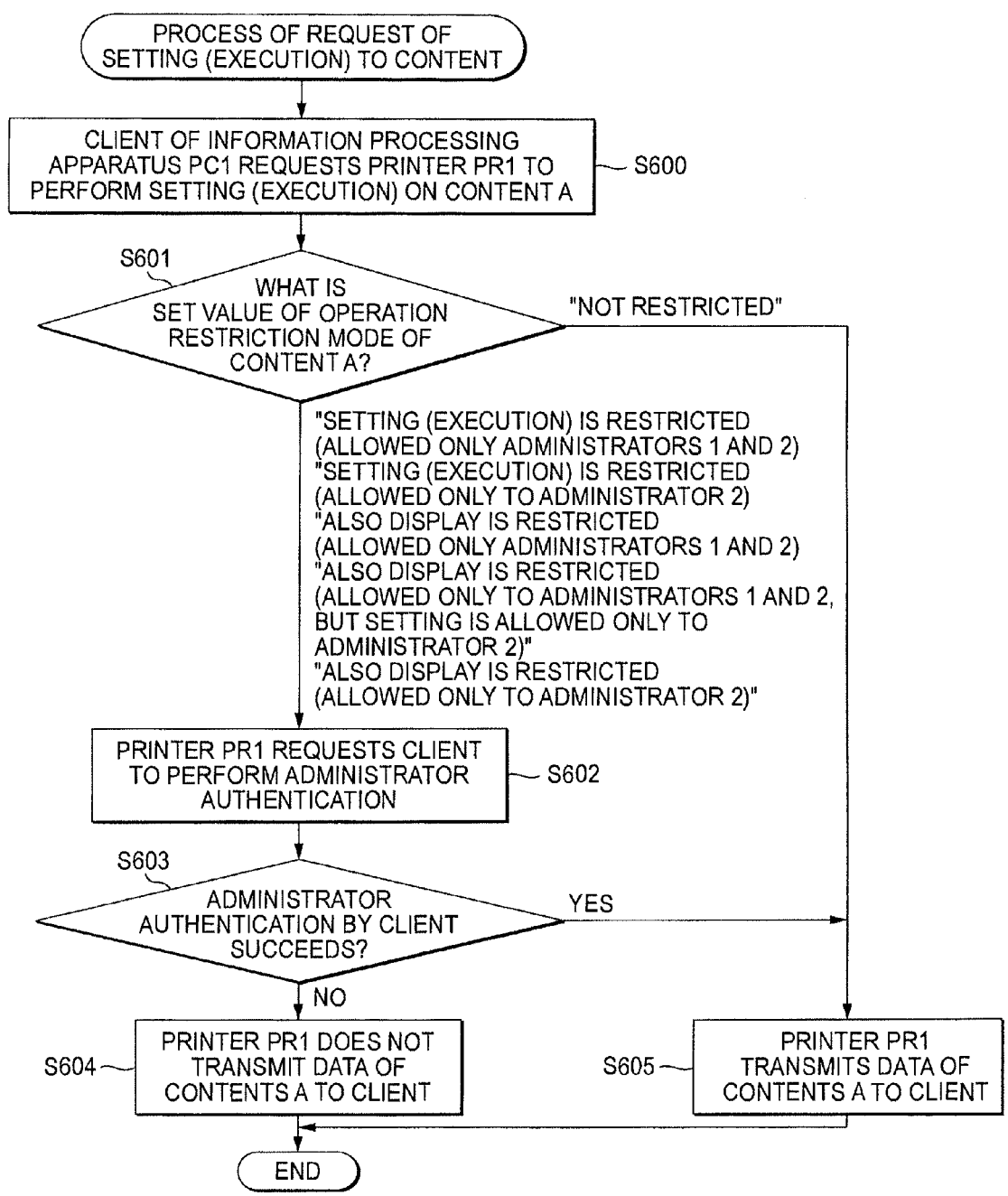
FIG. 13 is a flowchart showing the procedure of a process of a request of setting (execution) to content.

It is a matter of course that contents other than content A can be similarly processed by the process of a display request to a content shown in FIG. 13.

Second Exemplary Embodiment

Figure 14:
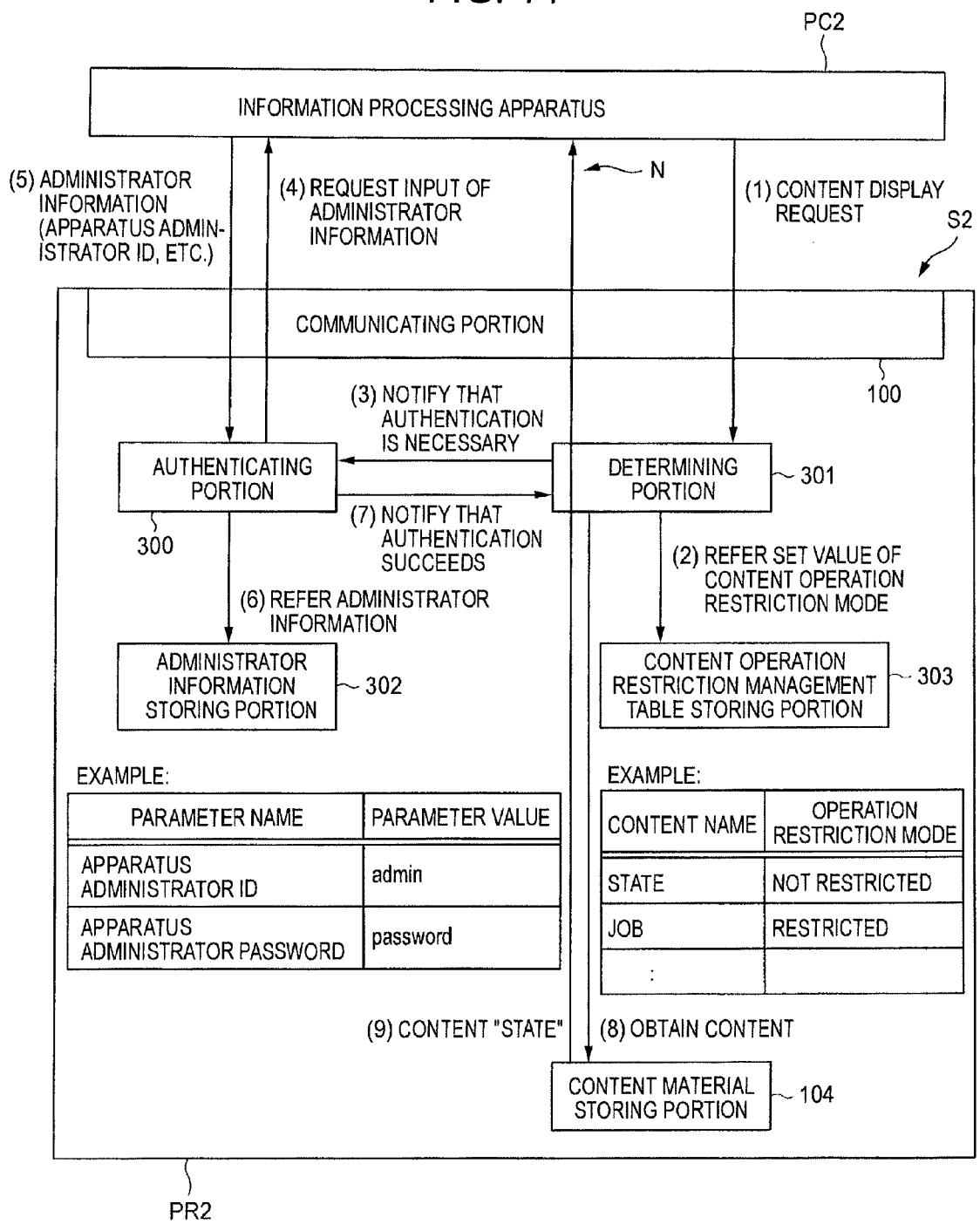
FIG. 14 is a block diagram showing the configuration of an information processing system S2 which is a second exemplary embodiment.

Referring to the block diagram of FIG. 14, the configuration of an information processing system S2 which is a second exemplary embodiment of the invention will be described.

Components similar to those of the image forming system S1 of the first exemplary embodiment are designated by the same reference numerals, and their description will be omitted.

The information processing system S2 is different from the image forming system S1 in that a printer PR2 of the information processing system S2 is not provided with an embedded web server (EWS).

The printer PR2 comprises individually, in place of an EWS, an authenticating portion 300, a determining portion 301, an administrator information storing portion 302, and a content operation restriction management table storing portion 303.

An information processing apparatus PC2 which is connected to the printer PR2 through a network is not required to comprise a web browser, and transmits and receives contents (information) to and from the printer PR2 with using predetermined application software or an FTP protocol.

The various processes (the process of an access request to a content, that of a display request, and that of a request of setting (execution)) which have been described in the first exemplary embodiment can be similarly executed also in the information processing system S2.

Third Exemplary Embodiment

Referring to FIGS. 15 to 24, the configuration of an information processing system S3 which is a third exemplary embodiment of the invention will be described.

Figure 15:
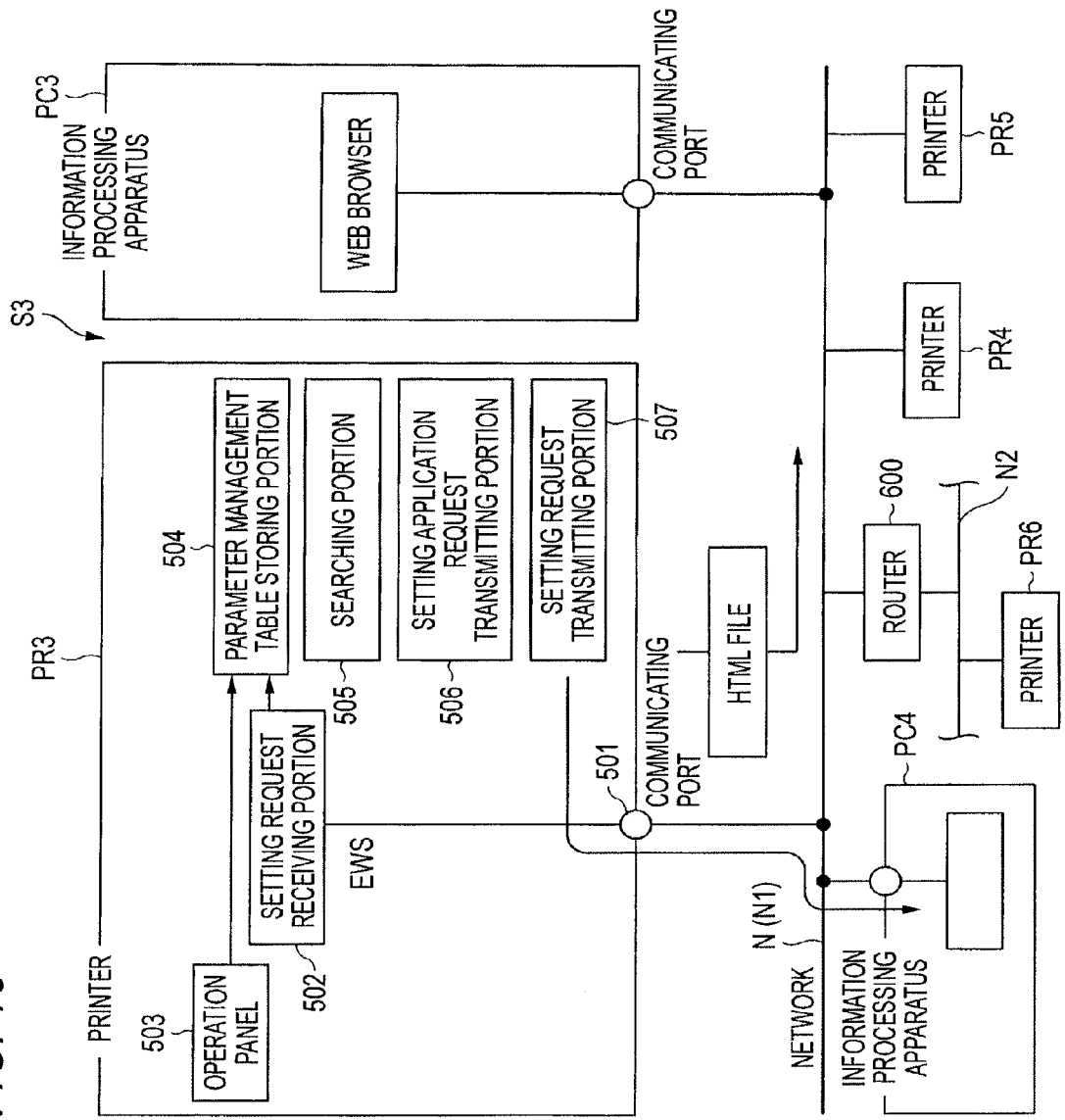
FIG. 15 is a block diagram showing the configuration of an information processing system S3 which is a third exemplary embodiment.

FIG. 15 is a block diagram showing the configuration of the image forming system S3 which is the third exemplary embodiment.

As shown in FIG. 15, the image forming system S3 is configured by: printers PR3, PR4, PR5, PR6 which are a kind of information processing apparatus (or image forming apparatus) having a network connection function through a network N (N1, N2) such as a LAN or the Internet; and information processing apparatuses PC3, PC4 for an administrator and configured by a personal computer or the like.

In the exemplary embodiment, the number of the information processing apparatuses is not particularly restricted. An image inputting apparatus (such as a scanner) having a network function may be additionally connected.

In the exemplary embodiment, the type of the printers PR3 to PR6 is not particularly limited, and may be any one of printers having a network connection function such as a laser printer, a full-color printer, or an inkjet printer.

The information processing apparatuses PC3, PC4 are provided with a web browser which operates on a usual OS (Operating System), so that the apparatuses can access at least the printer PR3 through the network N to perform browsing of web contents (web pages), predetermined setting, etc.

The configurations of the information processing apparatuses PC3, PC4 are not particularly restricted, and, for example, comprise a keyboard and a mouse as inputting means, and a liquid crystal display device as displaying means.

In the exemplary embodiment, the printers PR3 to PR5 have the same configuration. However, the exemplary embodiment is not restricted to this, and the printers may have different configurations.

The printer PR3 comprises a configuration for realizing a printing function including a sheet conveying mechanism, a printer engine (image forming section), and the like. A usual configuration may be employed, and therefore its description is omitted.

FIG. 15 shows only the configuration of the printer PR3 required for implementing the invention.

As shown in FIG. 15, the printer PR3 comprises: a communicating port 501 which is connected to the network N to transmit and receive data (information) such as various requests to and from the information processing apparatus PC3 and the like; an embedded web server (hereinafter, abbreviated as EWS) 502 serving as a request accepting section (setting request receiving portion); an operation panel 503 through which various settings are performed; a parameter management table storing portion 504 which stores a parameter management table in the form of a table; a searching portion 505 which searches a printer (the printer PR4, the printer PR5, or the like) connected to the network N; a setting application request transmitting portion 506 which transmits a setting application request to a searched printer or the like; and a setting request transmitting portion 507 which transmits a setting request to the information processing apparatus PC4 or the like.

In the network N of the exemplary embodiment, separate networks (for example, networks N1, N2 and the like) are configured by a router 600. Namely, the networks N1, N2 constitute separate broadcast domains.

Next, with reference to the flowchart of FIG. 16, the procedure of the setting application process which is executed in the information processing system S3 of the exemplary embodiment will be described.

In step S700, first, the user operates a web browser to access the EWS 502 of the printer PR3 to register the network address of the network N2. Thereafter, the process proceeds to step S701.

In step S701, the user instructs a setting of parameters of the printer PR3 through the EWS 502.

In step S702, the printer PR3 searches a printer of the same standard (including the same type) on the same network (in this example, the network N1) and the network N2 of the registered network address, with using an SNMP request or the like. Thereafter, the process proceeds to step S703.

In step S703, the printers PR4, PR5, PR6 of the same standard (including the same type) on the same network N1 and the network N2 of the registered network address reply to the printer PR3 by means of an SNMP response. Thereafter, the process proceeds to step S704.

In step S704, the printer PR3 transmits a parameter setting instruction of the same setting contents to the printers PR4, PR5, PR6 which are found in the search.

In step S705, the printers PR4, PR5, PR6 to which the instruction has been transmitted enter a parameter setting application instruction waiting state. Thereafter, the process proceeds to step S706.

In step S706, it is determined whether the setting application instruction is performed through the operation panel 503 of one of the printers PR3 to PR6 or not. If "No", the process proceeds to step S710 for performing a cancel instruction to proceed to one of subroutines of application instruction wait canceling processes 1 to 3. The procedures of the subroutines will be described later.

By contrast, if "Yes" is determined in step S706, the process proceeds to step S707, and a printer through which the setting application is instructed transmits the setting application instruction to the other printers through the network N (N1, N2).

In step S708, parameter setting is applied to the printers PR4, PR5, PR6 which receive the setting application instruction.

Therefore, the parameter setting in all the printers PR3 to PR6 is completed (step S709), and the process is ended.

With reference to the flowcharts of FIGS. 17 to 19, the procedures of the subroutines of application instruction wait canceling processes 1 to 3 to which the process proceeds in step S710 will be described.

Figure 17:
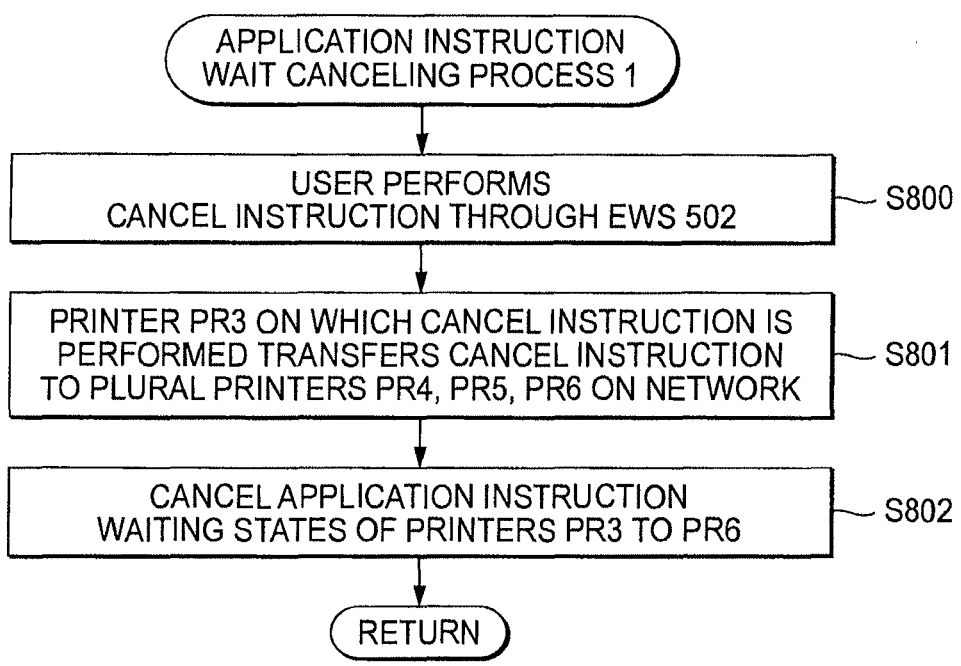
FIG. 17 is a flowchart showing the procedure of application instruction wait canceling process 1.

As shown in the flowchart of FIG. 17, in the application instruction wait canceling process 1, the user performs in step S800 the cancel instruction through the EWS 502, and the process then proceeds to step S801.

In step S801, the printer PR3 on which the cancel instruction is performed transfers the cancel instruction to the plural printers PR4, PR5, PR6 on the network N, and the process then proceeds to step S802.

Figure 16:
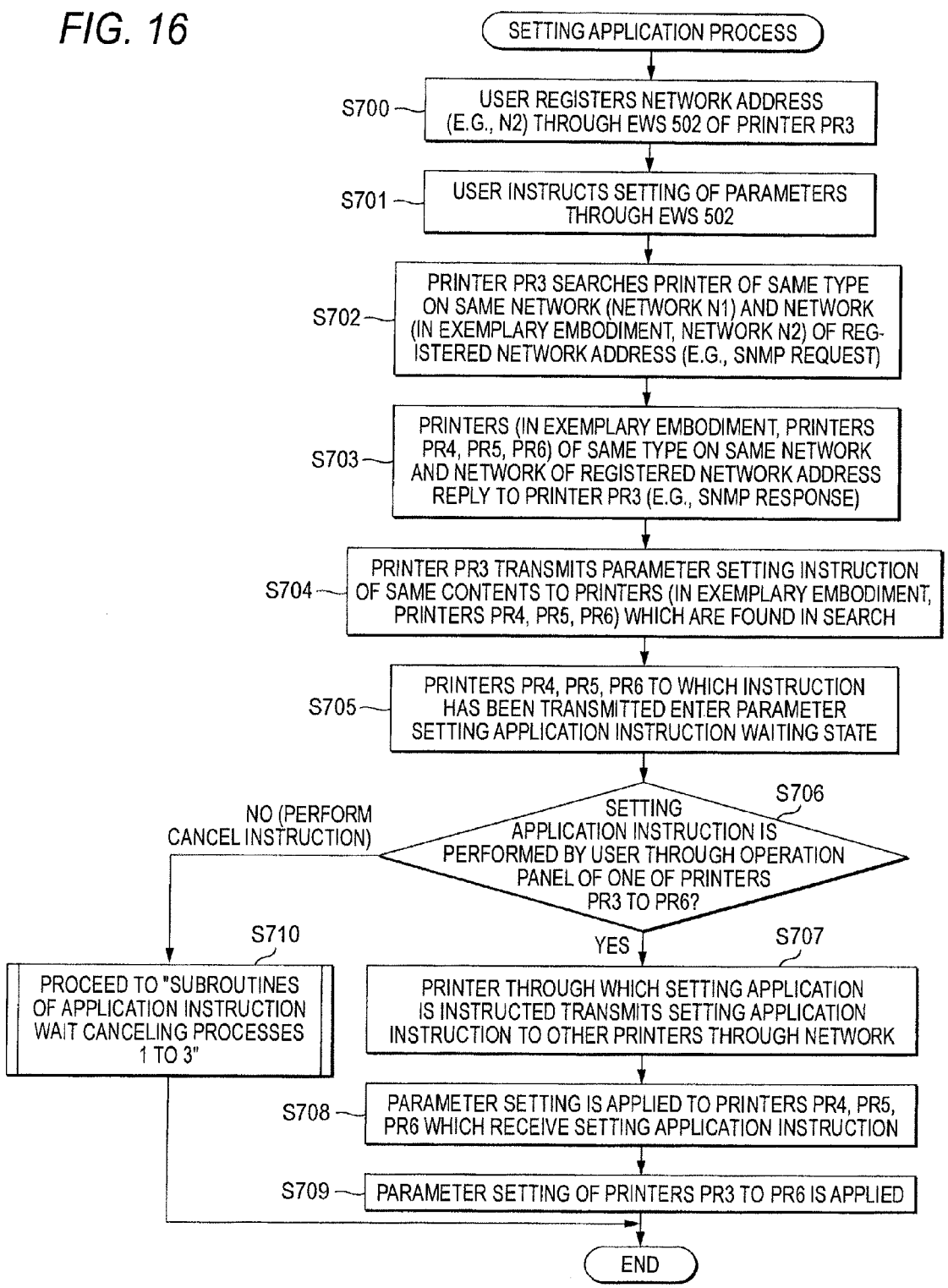
FIG. 16 is a flowchart showing the procedure of a setting application process.

In step S802, the application instruction waiting states of the printers PR3 to PR6 are canceled, and the process returns to the flowchart of FIG. 16, and is then ended.

Figure 18:
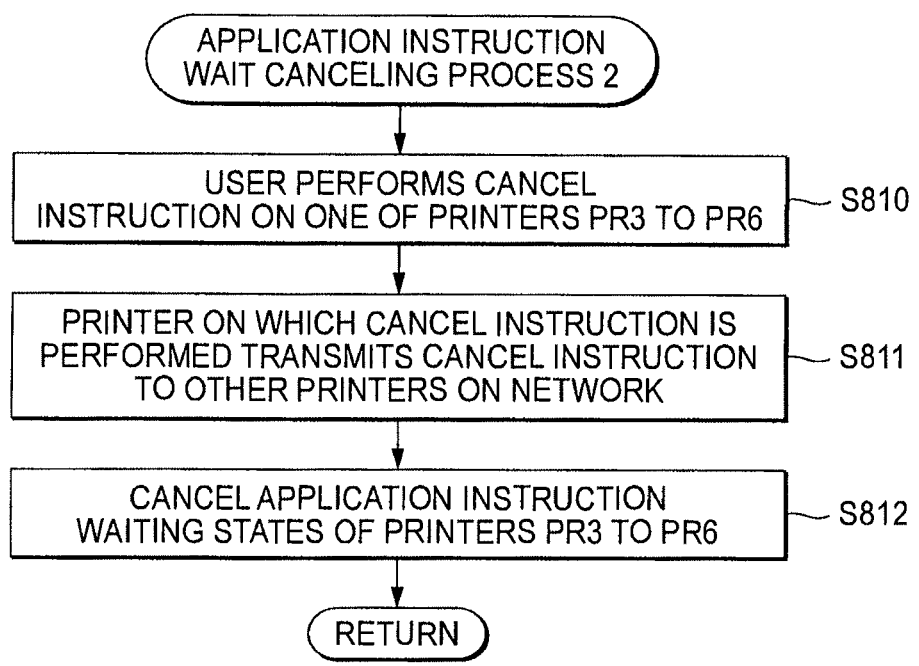
FIG. 18 is a flowchart showing the procedure of application instruction wait canceling process 2.

As shown in the flowchart of FIG. 18, in the application instruction wait canceling process 2, the user performs in step S810 the cancel instruction on one of the printers PR3 to PR6, and the process then proceeds to step S811.

In step S811, the printer on which the cancel instruction is performed transmits the cancel instruction to the other printers on the network N.

Therefore, the application instruction waiting states of the printers PR3 to PR6 are canceled (step S812), and the process returns to the flowchart of FIG. 16, and is then ended.

Figure 19:
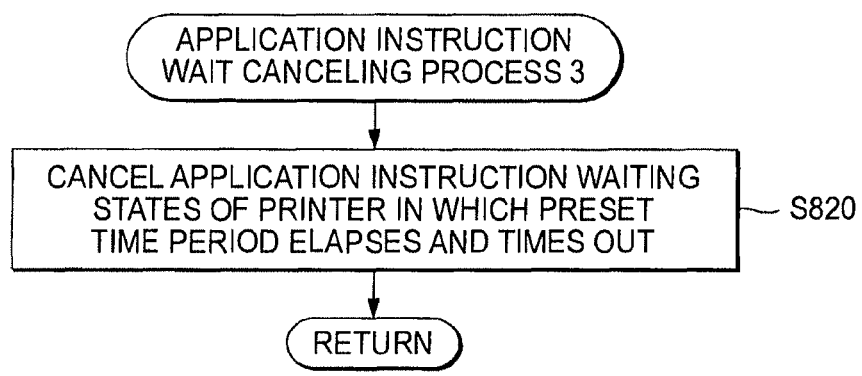
FIG. 19 is a flowchart showing the procedure of application instruction wait canceling process 3.

As shown in step S820 of the flowchart of FIG. 19, in the application instruction wait canceling process 3, the application instruction waiting state of a printer in which the preset time period elapses and times out is canceled. Thereafter, the process returns to the flowchart of FIG. 16, and is then ended.

In the exemplary embodiment, therefore, information (the setting application instruction or the cancel instruction) can be transmitted to the printers connected to the network N without omission, and the convenience and the security can be improved.

Figure 20:
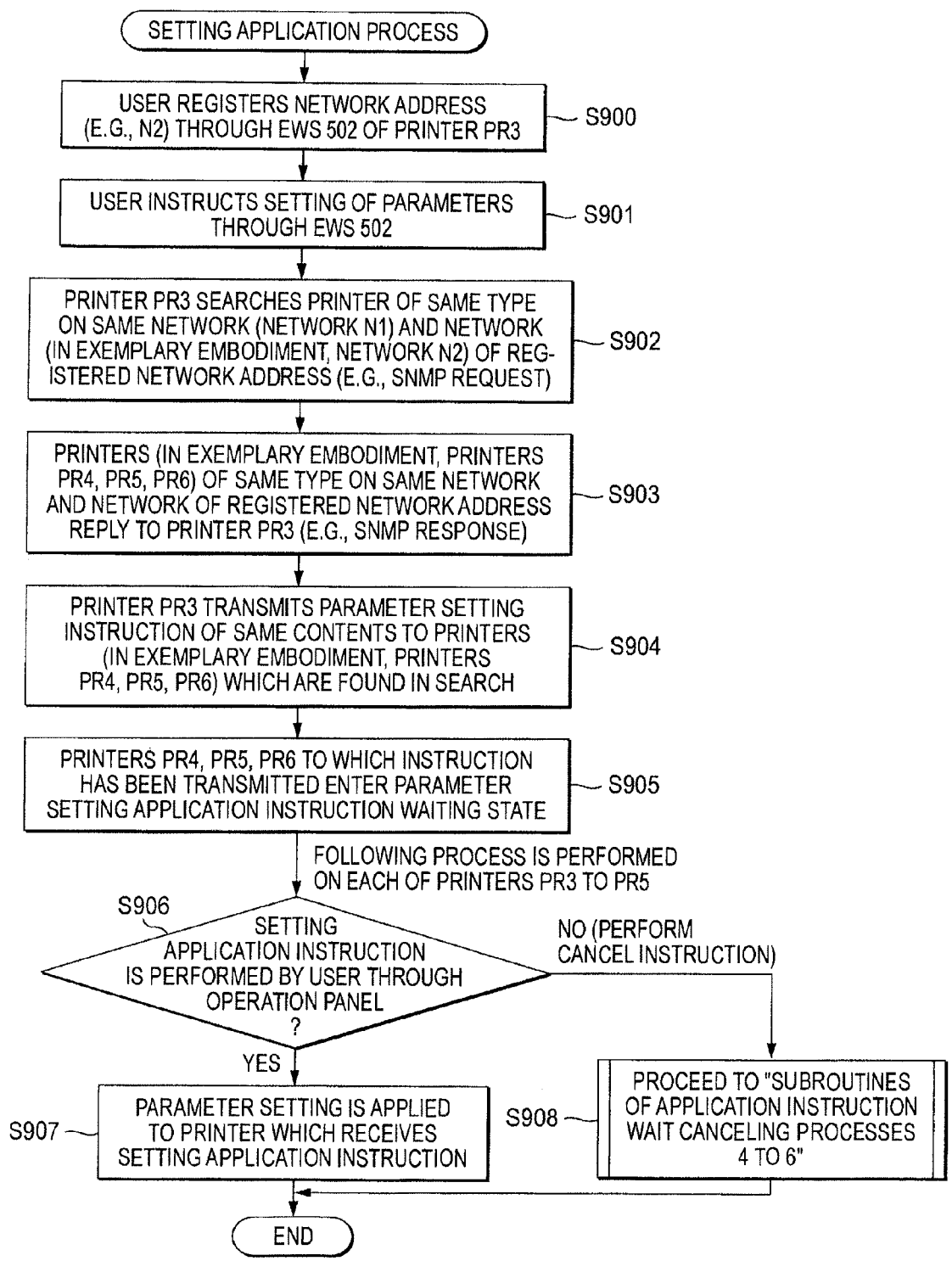
FIG. 20 is a flowchart showing the procedure of a setting application process.

Next, with reference to the flowchart of FIG. 20, another procedure of the setting application process which is executed in the information processing system S3 of the exemplary embodiment will be described.

In step S900, first, the user registers the network address of the network N2 through the EWS 502 of the printer PR3. Thereafter, the process proceeds to step S901.

In step S901, the user instructs a setting of parameters of the printer PR3 through the EWS 502.

In step S902, the printer PR3 searches a printer of the same standard (including the same type) on the same network (in this example, the network N1) and the network N2 of the registered network address, with using an SNMP request or the like. Thereafter, the process proceeds to step S903.

In step S903, the printers PR4, PR5, PR6 of the same standard (including the same type) on the same network N1 and the network N2 of the registered network address reply to the printer PR3 by means of an SNMP response. Thereafter, the process proceeds to step S904.

In step S904, the printer PR3 transmits a parameter setting instruction of the same setting contents to the printers PR4, PR5, PR6 which are found in the search.

In step S905, the printers PR4, PR5, PR6 to which the instruction has been transmitted enter a parameter setting application instruction waiting state. Thereafter, the process proceeds to step S906.

In step S906, it is determined whether the setting application instruction is performed through the operation panel 503 of each of the printers PR3 to PR6 or not. If "No", the process proceeds to step S908 for performing a cancel instruction to proceed to one of subroutines of application instruction wait canceling processes 4 to 6. The procedures of the subroutines will be described later.

By contrast, if "Yes" is determined in step S906, the process proceeds to step S907 in which parameter setting is applied to the printer which receives the setting application instruction, and the process is ended With reference to the flowcharts of FIGS. 21 to 24, the procedures of the subroutines of application instruction wait canceling processes 4 to 6 to which the process proceeds in step S908 will be described.

Figure 21:
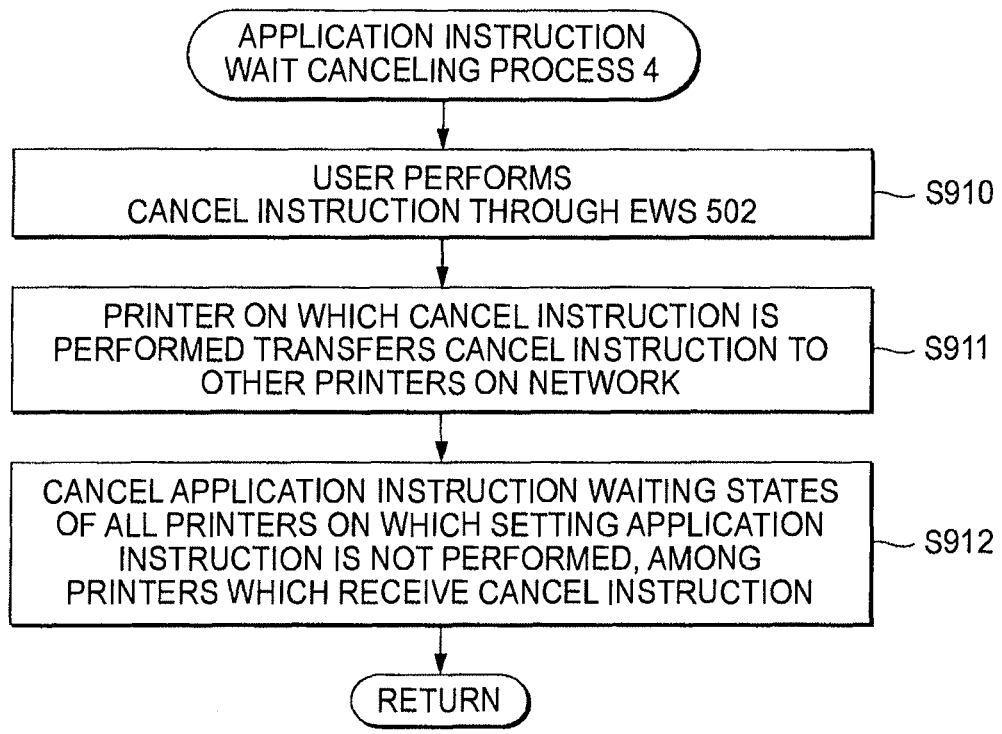
FIG. 21 is a flowchart showing the procedure of application instruction wait canceling process 4.

As shown in the flowchart of FIG. 21, in the application instruction wait canceling process 4, the user performs in step S910 the cancel instruction through the EWS 502, and the process then proceeds to step S911.

In step S911, the printer on which the cancel instruction is performed transfers the cancel instruction to the other printers on the network N, and the process then proceeds to step S912.

In step S912, among printers which receive the cancel instruction, the application instruction waiting states of all printers on which the setting application instruction is not performed are canceled, and the process returns to the flowchart of FIG. 16, and is then ended.

Figure 22:
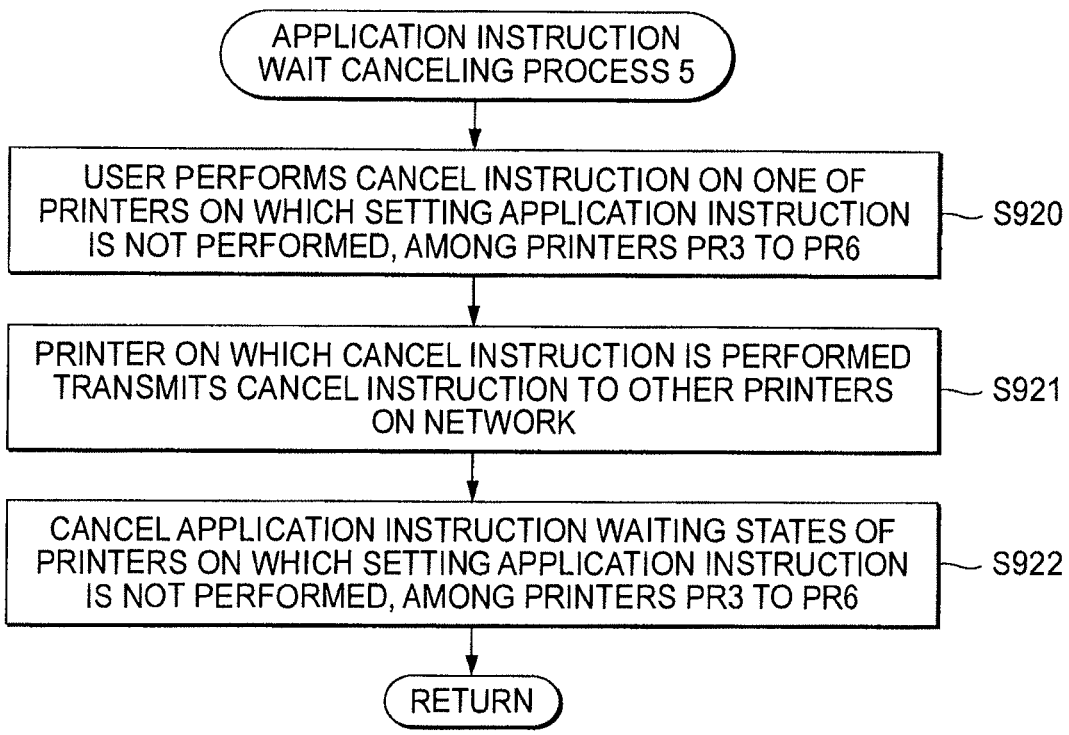
FIG. 22 is a flowchart showing the procedure of application instruction wait canceling process 5.

As shown in the flowchart of FIG. 22, in the application instruction wait canceling process 5, the user performs in step S920 the cancel instruction on one of printers on which the setting application instruction is not performed, among the printers PR3 to PR6, and the process then proceeds to step S921.

In step S921, the printer on which the cancel instruction is performed transmits the cancel instruction to the other printers on the network N.

Therefore, the application instruction waiting states of printers on which the setting application instruction is not performed, among the printers PR3 to PR6 are canceled (step S922), and the process returns to the flowchart of FIG. 16, and is then ended.

Figure 23:
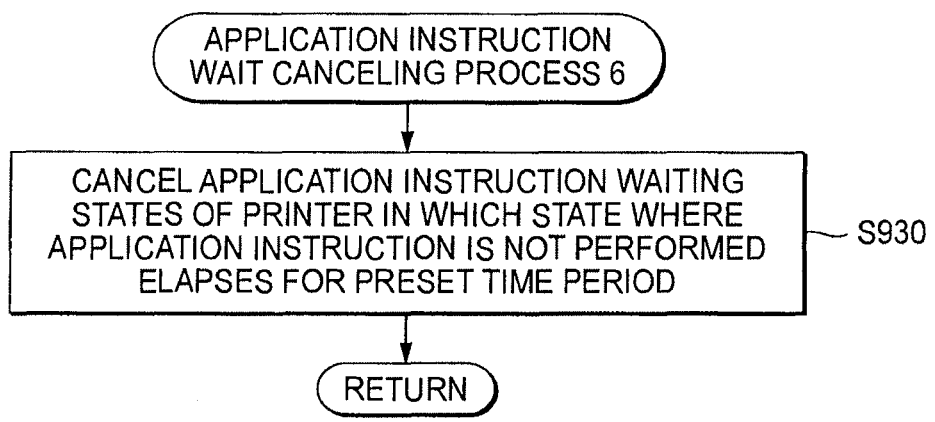
FIG. 23 is a flowchart showing the procedure of application instruction wait canceling process 6.

As shown in step S930 of the flowchart of FIG. 23, in the application instruction wait canceling process 6, the application instruction waiting state of a printer in which the preset time period elapses and times out is canceled. Thereafter, the process returns to the flowchart of FIG. 16, and is then ended.

In the exemplary embodiment, therefore, information (the setting application instruction or the cancel instruction) can be transmitted to the printers connected to the network N without omission, and the convenience and the security can be improved.

Figure 24:
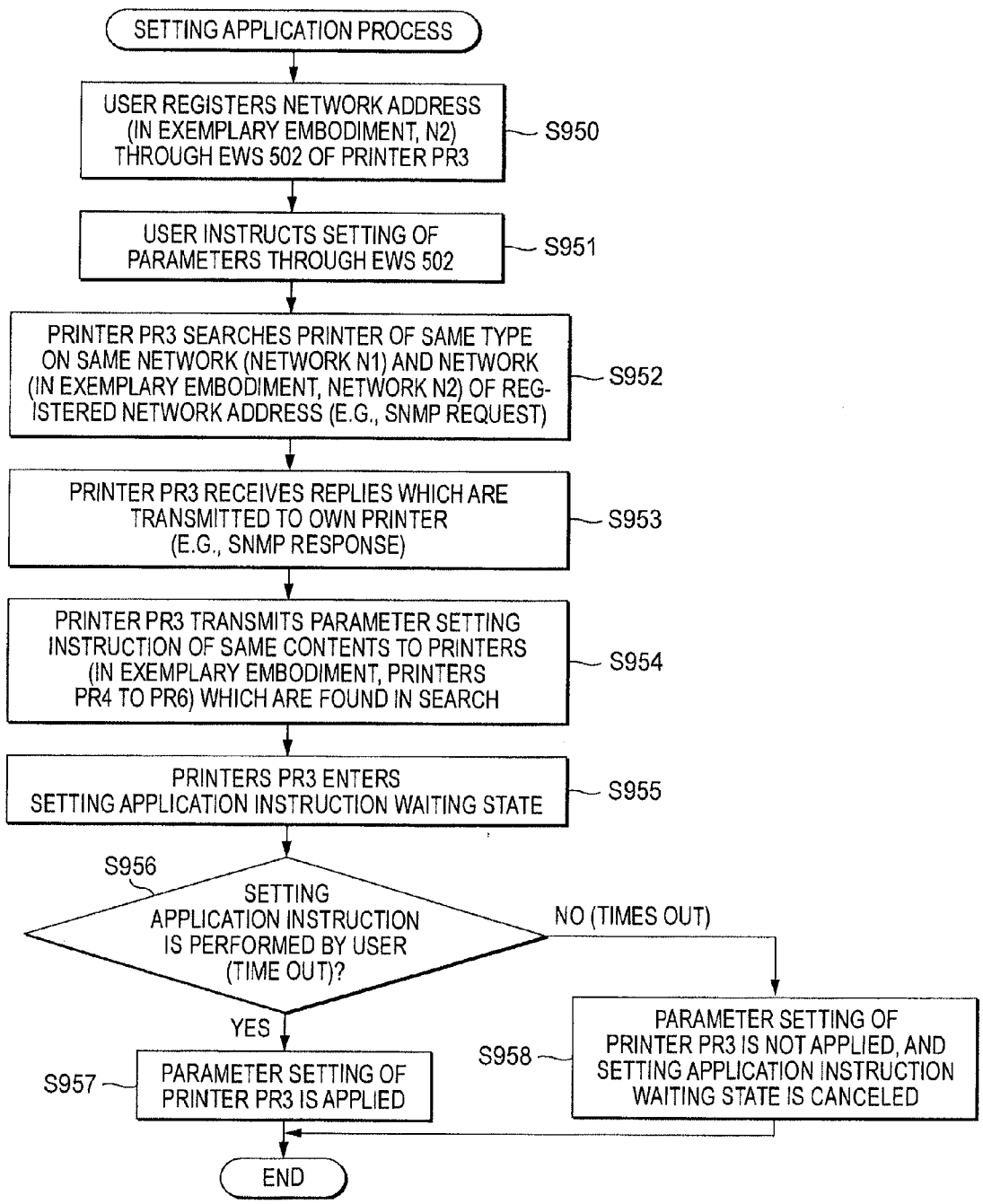
FIG. 24 is a flowchart showing the procedure of a setting application process.

Next, with reference to the flowchart of FIG. 24, the procedure of the setting application process which is executed in the printer PR3 will be described.

In step S950, first, the user registers the network address of the network N2 through the EWS 502 of the printer PR3. Thereafter, the process proceeds to step S951.

In step S951, the user instructs a setting of parameters of the printer PR3 through the EWS 502.

In step S952, the printer PR3 searches a printer of the same standard (including the same type) on the same network (in this example, the network N1) and the network N2 of the registered network address, with using an SNMP request or the like. Thereafter, the process proceeds to step S953.

In step S953, the printer PR3 receives replies which are transmitted to the own printer by means of an SNMP response. Thereafter, the process proceeds to step S954.

In step S954, the printer PR3 transmits a parameter setting instruction of the same setting contents to the printers PR4, PR5, PR6 which are found in the search, and the process then proceeds to step S955.

In step S955, the printer PR3 enters the setting application instruction waiting state, and the process then proceeds to step S956.

In step S956, it is determined whether the setting application instruction is performed by the user or the preset time period elapses and times out or not. If the setting application instruction is not performed and the time period times out (if "No"), the process proceeds to step S958 in which the parameter setting of the printer PR3 is not applied, and the setting application instruction waiting state is canceled. Thereafter, the process is ended.

If "Yes" is determined in step S956, the process proceeds to step S957 in which the parameter setting of the printer PR3 is applied. Thereafter, the process is ended.

As described above, the setting application instruction (instruction for executing the process) is transmitted to the external printers PR4 to PR6, and hence the external printers PR4 to PR6 can use the instruction for executing the process. Therefore, the process can be simplified, and the convenience can be improved.

When the measurement of a predetermined time period is ended (times out), the execution of the process is canceled (the parameter setting is not applied, and the setting application instruction waiting state is canceled). Therefore, a situation that the printer is left to stand for a long time can be avoided, and the security can be improved.

Although the invention conducted by the inventor has been specifically described on the basis of the exemplary embodiments, the exemplary embodiments disclosed in the specification are exemplarily shown in all aspects, and it is to be understood that the invention is not restricted to the disclosed techniques. Namely, the technical scope of the invention should not be restrictively interpreted on the basis of the description of the exemplary embodiments, and should be interpreted in accordance with the description of the appended claims. The invention includes techniques equivalent to those set forth in the claims, and all changes within the scopes of the claims.

In the case where programs are used, they can be provided through a network, or in the form that they are stored in a recording medium such as a CD-ROM.

INDUSTRIAL APPLICABILITY

The information processing apparatus, the information processing system, the information processing program, the image forming apparatus, the image forming system, and the image forming program of the invention can be applied to an apparatus such as a personal computer, or a laser printer, full-color printer, facsimile apparatus, or the like which has a network connection function.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image forming apparatus in a first network, the image forming apparatus comprising:
   a searching section configured to search for another image forming apparatus in the first network and a second network different from the first network; and
   a transmitting section configured to transmit a setting for the image forming apparatus to the other image forming apparatus,
   wherein the image forming apparatus is a same type of image forming apparatus as the other image forming apparatus,
   wherein the transmitting section is configured to directly transmit the setting to the other image forming apparatus if the other image forming apparatus is in the first network and the transmitting section is configured to transmit the setting to the other image forming apparatus using a router as an intermediary if the other image forming apparatus is in the second network that is different from the first network.

2. The image forming apparatus as claimed in claim 1, wherein the other image forming apparatus conforms to a same standard as a predetermined standard of the image forming apparatus.

3. The image forming apparatus as claimed in claim 1, wherein the other image forming apparatus is in the first network.

4. The image forming apparatus as claimed in claim 1, further comprising:
   a request accepting section configured to accept a predetermined request.

5. The image forming apparatus as claimed in claim 4, wherein the request accepting section comprises an embedded web server.

6. The image forming apparatus as claimed in claim 4, wherein in response to a cancel instruction being sent to the request accepting section, the transmitting section is configured to transmit the cancel instruction to the other image forming apparatus.

7. The image forming apparatus as claimed in claim 4, wherein the other forming apparatus is the second network.

8. The image forming apparatus as claimed in claim 7, wherein the second network is registered through the request accepting section of the image forming apparatus.

9. The image forming apparatus as claimed in claim 1, further comprising:
   a storing section configured to store a parameter management table including a plurality of settings,
   wherein the plurality of settings comprise the setting for forming the image.

10. The image forming apparatus as claimed in claim 1, wherein the other image forming apparatus is configured to receive the transmitted setting and set a setting in the other image forming apparatus to a same setting as the received setting from the image forming apparatus.

11. An image processing system comprising:
    a first image forming apparatus in a first network; and
    a second image forming apparatus,
    wherein the first image forming apparatus comprises:
        a searching section configured to search for the second image forming apparatus in the first network and a second network different from the first network; and
        a transmitting section configured to transmit a setting for the first image forming apparatus,
    wherein the second image forming apparatus is configured to receive the transmitted setting and set a setting in the second image forming apparatus to a same setting as the received setting from the first image forming apparatus,
    wherein the first image forming apparatus is a same type of image forming apparatus as the second image forming apparatus,
    wherein the transmitting section of the first image forming apparatus is configured to directly transmit the setting to the second image forming apparatus if the second image forming apparatus is in the first network and the transmitting section of the first image forming apparatus is configured to transmit the setting to the second image forming apparatus using a router as an intermediary if the second image forming apparatus is in the second network that is different from the first network.

12. The image processing system as claimed in claim 11, wherein the second image forming apparatus conforms to a same standard as a predetermined standard of the first image forming apparatus.

13. The image processing system as claimed in claim 11, wherein the second image forming apparatus is in the first network.

14. The image processing system according to claim 11, further comprising:
    a request accepting section configured to accept a predetermined request.

15. The image processing system as claimed in claim 14, wherein in response to a cancel instruction being sent to the request accepting section, the transmitting section is configured to transmit the cancel instruction to the second image forming apparatus.

16. The image processing system as claimed in claim 14, wherein the request accepting section comprises an embedded web server.

17. The image processing system as claimed in claim 14, wherein the second image forming apparatus is in the second network.

18. The image processing system as claimed in claim 17, wherein the second network is registered through the request accepting section of the first image forming apparatus.

19. The image processing system as claimed in claim 11, further comprising:
    a storing section configured to store a parameter management table including a plurality of settings,
    wherein the plurality of settings comprises the setting for forming the image.

20. An image forming apparatus in a first network, the image forming apparatus comprising:
    a searching section configured to search for another image forming apparatus in the first network and a second network different from the first network; and
    a transmitting section configured to transmit a setting for the image forming apparatus to the other image forming apparatus,
    wherein the image forming apparatus is a same type of image forming apparatus as the other image forming apparatus,
    wherein the transmitting section is configured to transmit the setting to the other image forming apparatus without using a router as an intermediary if the other image forming apparatus is in the first network and the transmitting section is configured to transmit the setting to the other image forming apparatus using the router as the intermediary if the other image forming apparatus is in the second network that is different from the first network.

21. The image forming apparatus of claim 20, wherein the second network is previously registered with the image forming apparatus.

22. The image forming apparatus of claim 1, wherein the second network is previously registered with the image forming apparatus.

23. The image forming apparatus of claim 11, wherein the second network is previously registered with the image forming apparatus.

* * * * *